US009628573B1

(12) United States Patent
Goodspeed et al.

(10) Patent No.: US 9,628,573 B1
(45) Date of Patent: Apr. 18, 2017

(54) LOCATION-BASED INTERACTION WITH DIGITAL WORKS

(75) Inventors: Joshua M. Goodspeed, Seattle, WA (US); Tom Killalea, Seattle, WA (US); Purnima M. Mavinkurve, Seattle, WA (US); Todd Sullivan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 735 days.

(21) Appl. No.: 13/461,244

(22) Filed: May 1, 2012

(51) Int. Cl.
G06F 15/16 (2006.01)
H04L 29/08 (2006.01)

(52) U.S. Cl.
CPC ................................... *H04L 67/18* (2013.01)

(58) Field of Classification Search
CPC ... H04L 67/18; H04L 67/306; H04L 65/4084; H04L 29/08306; G06F 17/30041; H04N 21/25841
USPC .................................................. 709/203–204
See application file for complete search history.

(56) References Cited

U.S. PATENT DOCUMENTS

| | | |
|---|---|---|
| 5,583,763 A | 12/1996 | Atcheson et al. |
| 5,986,690 A | 11/1999 | Hendricks |
| 6,016,475 A | 1/2000 | Miller et al. |
| 6,154,757 A | 11/2000 | Krause et al. |
| 6,266,649 B1 | 7/2001 | Linden et al. |
| 6,526,411 B1 | 2/2003 | Ward |
| 6,782,370 B1 | 8/2004 | Stack |
| 6,807,417 B2 | 10/2004 | Sallinen et al. |
| 6,869,287 B1 | 3/2005 | Tadlock et al. |
| 6,905,340 B2 | 6/2005 | Stansvik |
| 6,912,505 B2 | 6/2005 | Linden et al. |
| 6,947,922 B1 | 9/2005 | Glance |
| 6,963,838 B1 | 11/2005 | Christfort |
| 6,981,040 B1 | 12/2005 | Konig et al. |
| 7,065,047 B2 | 6/2006 | Boxall et al. |
| 7,103,848 B2 | 9/2006 | Barsness et al. |
| 7,412,442 B1 | 8/2008 | Vadon et al. |

(Continued)

FOREIGN PATENT DOCUMENTS

| | | |
|---|---|---|
| WO | WO2009071736 A1 | 6/2009 |
| WO | WO2010112951 A1 | 10/2010 |

OTHER PUBLICATIONS

Li et al., "Shopping Cart Abandonment at Retail Websites—A Multi-Stage Model of Online Shopping Behavior", Feb. 16, 2005, pp. 1-50.

(Continued)

*Primary Examiner* — Duyen Doan
(74) *Attorney, Agent, or Firm* — Lee & Hayes, PLLC

(57) ABSTRACT

In some implementations, a service provider may enable location-based interaction of a user of a device with at least one of a digital work or another user. For instance, when the service provider determines that the device of the user is at a particular physical location, the service provider may send a communication to notify the user that one or more digital works are available to be accessed at the current physical location of the device. As one example, a digital work may have been virtually left at the location by another user, and the digital work may be available to be accessed by the user currently at the location. As another example, the user may be attending an event and the service provider may offer a digital work related to the event when the user is determined to be at the location of the event.

30 Claims, 14 Drawing Sheets

(56) References Cited

U.S. PATENT DOCUMENTS

| | | | |
|---|---|---|---|
| 7,428,411 B2 | 9/2008 | Zellner | |
| 7,523,191 B1 | 4/2009 | Thomas et al. | |
| 7,533,082 B2 | 5/2009 | Abbott et al. | |
| 7,542,951 B1 | 6/2009 | Chakrabarti et al. | |
| 7,552,068 B1 | 6/2009 | Brinkerhoff | |
| 7,562,185 B2 | 7/2009 | Matsuda et al. | |
| 7,636,677 B1 | 12/2009 | McGonigal et al. | |
| 7,730,216 B1 | 6/2010 | Issa et al. | |
| 7,860,895 B1 | 12/2010 | Scofield et al. | |
| 7,867,094 B1 | 1/2011 | Wisdom et al. | |
| 8,041,657 B1 | 10/2011 | Nguyen et al. | |
| 8,060,525 B2 | 11/2011 | Svendsen et al. | |
| 8,065,619 B2 | 11/2011 | Agarwal et al. | |
| 8,117,193 B2 | 2/2012 | Svendsen et al. | |
| 8,219,071 B2 | 7/2012 | Kokubo et al. | |
| 8,510,247 B1 | 8/2013 | Kane, Jr. et al. | |
| 8,666,538 B2 | 3/2014 | Deas et al. | |
| 8,977,296 B1* | 3/2015 | Briggs | H04W 64/003 455/456.1 |
| 9,262,596 B1* | 2/2016 | Steiner | G06F 21/10 |
| 2001/0037360 A1 | 11/2001 | Ekkel | |
| 2002/0004742 A1 | 1/2002 | Willcocks et al. | |
| 2002/0055089 A1 | 5/2002 | Scheirer | |
| 2002/0120635 A1 | 8/2002 | Joao | |
| 2002/0169822 A1 | 11/2002 | Packard et al. | |
| 2002/0178166 A1 | 11/2002 | Hsia | |
| 2003/0028889 A1 | 2/2003 | McCoskey et al. | |
| 2003/0046678 A1 | 3/2003 | Boxall et al. | |
| 2003/0093275 A1 | 5/2003 | Polanyi et al. | |
| 2003/0152894 A1 | 8/2003 | Townshend | |
| 2003/0210226 A1 | 11/2003 | Ho et al. | |
| 2004/0033777 A1 | 2/2004 | Farineau et al. | |
| 2004/0039593 A1 | 2/2004 | Eskandari | |
| 2004/0199527 A1 | 10/2004 | Morain et al. | |
| 2004/0201633 A1 | 10/2004 | Barsness et al. | |
| 2004/0215733 A1 | 10/2004 | Gondhalekar et al. | |
| 2005/0006154 A1 | 1/2005 | Back et al. | |
| 2005/0026131 A1 | 2/2005 | Elzinga et al. | |
| 2005/0027671 A1 | 2/2005 | Hind et al. | |
| 2005/0069849 A1 | 3/2005 | McKinney et al. | |
| 2005/0113650 A1 | 5/2005 | Pacione et al. | |
| 2005/0114694 A1 | 5/2005 | Wager et al. | |
| 2006/0020973 A1 | 1/2006 | Hannum et al. | |
| 2006/0047644 A1 | 3/2006 | Bocking et al. | |
| 2006/0136393 A1 | 6/2006 | Abbott et al. | |
| 2006/0143133 A1 | 6/2006 | Medvinsky | |
| 2006/0223508 A1 | 10/2006 | Starr et al. | |
| 2006/0266830 A1 | 11/2006 | Horozov et al. | |
| 2006/0271552 A1 | 11/2006 | McChesney et al. | |
| 2006/0271618 A1 | 11/2006 | Kokubo et al. | |
| 2007/0027852 A1 | 2/2007 | Howard et al. | |
| 2007/0028266 A1 | 2/2007 | Trajkovic et al. | |
| 2007/0048696 A1 | 3/2007 | Blank | |
| 2007/0055926 A1 | 3/2007 | Christiansen et al. | |
| 2007/0124046 A1 | 5/2007 | Ayoub et al. | |
| 2007/0168892 A1 | 7/2007 | Brush et al. | |
| 2007/0203763 A1 | 8/2007 | Ackley et al. | |
| 2007/0204223 A1 | 8/2007 | Bartels et al. | |
| 2007/0204308 A1 | 8/2007 | Nicholas et al. | |
| 2007/0219949 A1 | 9/2007 | Mekikian | |
| 2007/0224586 A1 | 9/2007 | Massie et al. | |
| 2007/0266002 A1 | 11/2007 | Chowdhury et al. | |
| 2007/0281692 A1 | 12/2007 | Bucher et al. | |
| 2007/0299737 A1 | 12/2007 | Plastina et al. | |
| 2008/0016205 A1 | 1/2008 | Svendsen | |
| 2008/0057924 A1 | 3/2008 | Stewart | |
| 2008/0059422 A1 | 3/2008 | Tenni et al. | |
| 2008/0065507 A1 | 3/2008 | Morrison et al. | |
| 2008/0086261 A1 | 4/2008 | Robinson et al. | |
| 2008/0092244 A1 | 4/2008 | Lee | |
| 2008/0140412 A1 | 6/2008 | Millman et al. | |
| 2008/0189733 A1 | 8/2008 | Apostolopoulos | |
| 2008/0195664 A1 | 8/2008 | Maharajh et al. | |
| 2008/0201206 A1 | 8/2008 | Pokorney et al. | |
| 2008/0201348 A1 | 8/2008 | Edmonds et al. | |
| 2008/0201643 A1 | 8/2008 | Nagaitis et al. | |
| 2008/0263014 A1 | 10/2008 | Garijo Mazario et al. | |
| 2008/0294584 A1 | 11/2008 | Herz | |
| 2008/0301737 A1 | 12/2008 | Hjelmeland Almas et al. | |
| 2008/0313040 A1 | 12/2008 | Rose et al. | |
| 2009/0085803 A1 | 4/2009 | Mergen | |
| 2009/0113532 A1 | 4/2009 | Lapidous | |
| 2009/0133059 A1 | 5/2009 | Gibbs et al. | |
| 2009/0150489 A1 | 6/2009 | Davis et al. | |
| 2009/0150501 A1 | 6/2009 | Davis et al. | |
| 2009/0157714 A1 | 6/2009 | Stanton et al. | |
| 2009/0157899 A1 | 6/2009 | Gagliardi et al. | |
| 2009/0164429 A1 | 6/2009 | Svendsen et al. | |
| 2009/0164641 A1 | 6/2009 | Rogers et al. | |
| 2009/0177745 A1 | 7/2009 | Davis et al. | |
| 2009/0213001 A1 | 8/2009 | Appelman et al. | |
| 2009/0216623 A1 | 8/2009 | Hendricks et al. | |
| 2009/0228126 A1 | 9/2009 | Spielberg et al. | |
| 2009/0248833 A1* | 10/2009 | Frazier | G06F 17/30041 709/217 |
| 2009/0254409 A1 | 10/2009 | Kozhukh | |
| 2009/0254529 A1 | 10/2009 | Goldentouch | |
| 2009/0265750 A1 | 10/2009 | Jones et al. | |
| 2009/0271514 A1 | 10/2009 | Thomas et al. | |
| 2009/0281851 A1 | 11/2009 | Newton et al. | |
| 2010/0042702 A1 | 2/2010 | Hanses | |
| 2010/0056183 A1* | 3/2010 | Oh | H04L 12/1818 455/456.3 |
| 2010/0076274 A1 | 3/2010 | Severson | |
| 2010/0082376 A1 | 4/2010 | Levitt | |
| 2010/0088746 A1 | 4/2010 | Kota et al. | |
| 2010/0106263 A1 | 4/2010 | Charania | |
| 2010/0121777 A1 | 5/2010 | McGonigal et al. | |
| 2010/0131455 A1 | 5/2010 | Logan et al. | |
| 2010/0146091 A1 | 6/2010 | Curtis et al. | |
| 2010/0205541 A1 | 8/2010 | Rapaport et al. | |
| 2010/0223273 A1 | 9/2010 | Schneider | |
| 2010/0251304 A1 | 9/2010 | Donoghue et al. | |
| 2010/0313161 A1 | 12/2010 | Le Chevalier et al. | |
| 2010/0333137 A1 | 12/2010 | Hamano et al. | |
| 2011/0035284 A1* | 2/2011 | Moshfeghi | G06Q 30/02 705/14.58 |
| 2011/0060807 A1 | 3/2011 | Martin et al. | |
| 2011/0106736 A1 | 5/2011 | Aharonson et al. | |
| 2011/0320380 A1 | 12/2011 | Zahn et al. | |
| 2012/0282951 A1* | 11/2012 | Nguyen | H04L 65/4015 455/457 |
| 2012/0297466 A1* | 11/2012 | Li | G06F 21/10 726/7 |
| 2012/0310784 A1* | 12/2012 | Bartley | H04L 65/4084 705/27.1 |
| 2013/0046823 A1* | 2/2013 | Mitchell | G06Q 30/0269 709/204 |
| 2013/0067357 A1 | 3/2013 | Rose | |
| 2013/0111513 A1* | 5/2013 | Gaude | H04N 7/173 725/14 |
| 2013/0144968 A1* | 6/2013 | Berger | G06Q 50/01 709/217 |
| 2013/0173467 A1* | 7/2013 | Nuzzi | G06Q 20/405 705/44 |
| 2013/0174223 A1* | 7/2013 | Dykeman | G06F 21/10 726/4 |
| 2013/0244624 A1* | 9/2013 | Das | H04W 4/04 455/414.1 |
| 2015/0031400 A1* | 1/2015 | Tian | H04W 4/028 455/456.3 |
| 2015/0066648 A1 | 3/2015 | Kane, Jr. et al. | |

OTHER PUBLICATIONS

Final Office Action for U.S. Appl. No. 12/495,256, mailed on Jan. 27, 2012, Francis J. Kane JR et al., "Recommendations Based on Progress Data", 29 pages.

Office action for U.S. Appl. No. 12/495,351, mailed on Oct. 6, 2011, Kane et al., "Collection of Progress Data", 26 pages.

Office action for U.S. Appl. No. 12/495,351, mailed on Oct. 19, 2012, Kane, Jr. et al., "Collection of Progress Data", 39 pages.

(56) References Cited

OTHER PUBLICATIONS

Office action for U.S. Appl. No. 12/495,061, mailed on Nov. 21, 2012, Kane, Jr. et al., "Content Usage Analysis and Recommendations", 24 pages.
Office action for U.S. Appl. No. 12/495,179, mailed on Feb. 21, 2013, Kane, Jr. et al., "Reporting of Content Consumption Progress to Content Purveyors", 65 pages.
Non-Final Office Action for U.S. Appl. No. 12/495,351, mailed on Apr. 10, 2012, Kane et al., "Collection of Progress Data", 35 pages.
Non-Final Office Action for U.S. Appl. No. 12/495,179, mailed on May 24, 2012, Francis J. Kane JR et al., "Reporting of Content Consumption Progress to Content Purveyors", 42 pages.
Non-Final Office Action for U.S. Appl. No. 12/495,061, mailed on May 24, 2012, Francis J. Kane JR.et al., "Content Usage Analysis and Recommendations", 16 pages.
Non-Final Office Action for U.S. Appl. No. 12/495,256, mailed on Sep. 19, 2011, Francis J. Kane JR, "Recommendations Based on Progress Data", 24 pages.
Response to Office Action dated Nov. 21, 2011 for U.S. Appl. No. 12/495,061, filed Feb. 21, 2013, 19 pages.
Response to Office Action dated Nov. 6, 2012 for U.S. Appl. No. 12/495,009, filed Mar. 6, 2013, 15 pages.
Response to Office Action dated Feb. 13, 2012 for U.S. Appl. No. 12/495,009, filed Jul. 13, 2012, 26 pages.
Final Office Action for U.S. Appl. No. 12/495,009, mailed on Nov. 6, 2012, Francis J. Kane JR. et al., "Recommendation of Media Content Items Based on Geolocation and Venue", 12 pages.
Office action for U.S. Appl. No. 12/570,690, mailed on Jul. 15, 2013, Siegel et al., "Dynamic Access to Content Items Based on Venue", 62 pages.
Brunato, et al., "A Location-Dependent Recommender System for the Web", Technical report DIT-02-0093, Universita di Trento, Nov. 2002, pp. 1-8.
Cataldo, "LS on basic and advanced services examples", Technical Specification Group Services and System Aspects Meeting #11, Palm Springs, CA, USA, Mar. 19-22, 2001, 11 pages.
Funk, "The future of mobile shopping: The interaction between lead users and technological trajectories in the Japanese market", Technological Forecasting and Social Change 74, ScienceDirect, Elsevier, Nov. 10, 2005 pp. 341-356.
Hampton, "Neighborhoods in the Network Society The e-Neighbors Study", Information, Communication & Society, vol. 10, No. 5, Oct. 2007, pp. 714-748.
Lee, et al., "A time-based approach to effective recommender systems using implicit feedback", Expert Systems with Applications 34, ScienceDirect, Elsevier, vol. 34, Issue 4, May 2008, pp. 3055-3062.
Lee, et al., "A Time-based Recommender System using Implicit Feedback", Proceeding of Proceedings of the 2006 International Conference on E-Learning, E-Business, Enterprise Information Systems, E-Government & Outsourcing, Las Vegas, Nevada, USA, Jun. 26-29, 2006, 8 pages.
Li, et al, "Mining User Similarity Based on Location History", ACM GIS '08, Nov. 5-7, 2008, Irvine, CA, USA, 10 pages.
Miura, et al., "Adequate RSSI Determination Method by Making Use of SVM for Indoor Localization", KES 2006, Part II, LNAI 4252, Springer-Verlag Berlin Heidelberg 2006, pp. 628-636.
Office Action for U.S. Appl. No. 13/962,809, mailed on Nov. 8, 2013, Francis J. Kane Jr., "Recommendation of Media Content Items Based on Geolocation and Venue", 25 pages.
Park, et al., "Location-Based Recommendation System Using Bayesian User's Preference Model in Mobile Devices", UIC 2007, LNCS 4611, Springer-Verlag Berlin Heidelberg 2007, pp. 1130-1139.
Parle, et al., "Proximo, Location-Aware Collaborative Recommender", UCD School of Conputer Science & Informatics University College Dublin, Belfield, Dublin, Ireland, 2006, pp. 1-6.
Wu, et al., "Development of a tool for selecting mobile shopping site: A customer perspective", Electronic Commerce Research and Applications, ScienceDirect, Elsevier, 2006, pp. 192-200.
Yang, et al., "A location-aware recommender system for mobile shopping environments", Expert Systems with Applications 34, ScienceDirect, Elsevier, 2008, pp. 437-445.
"KidsWatch Time Limit Parental Control Web Filtering Software", retrieved on Oct. 29, 2013 at <<http://web.archive.org/web/20081217080426/http://kidswatch.com/Time-Limit-Controls.php>>, Computer Time Limits, Webarchive, Dec. 17, 2008, 2 pages.
Office Action for U.S. Appl. No. 12/495,256, mailed on Jan. 30, 2014, Francis J. Kane, Jr., "Recommendations Based on Progress Data", 25 pages.
Office Action for U.S. Appl. No. 12/570,690, mailed on Feb. 4, 2014, Hilliard B. Siegel, "Dynamic Access to Content Items Based on Venue", 63 pages.
Office Action for U.S. Appl. No. 12/495,061, mailed on Feb. 5, 2014, Francis J. Kane Jr., "Content Usage Analysis and Recommendations", 32 pages.
Final Office Action for U.S. Appl. No. 13/962,809, mailed on Mar. 24, 2014, Francis J. Kane Jr, "Recommendation of Media Content Items Based on Geolocation and Venue", 41 pages.
Final Office Action for U.S. Appl. No. 12/495,061, mailed on May 28, 2014, Francis J. Kane, Jr., "Content Usage Analysis and Recommendations", 31 pages.
Final Office Action for U.S. Appl. No. 12/495,256, mailed on Jun. 5, 2014, Francis J. Kane Jr., "Recommendations Based on Progress Data", 18 pages.
Office action for U.S. Appl. No. 12/495,061, mailed on Oct. 7, 2014, Kane, Jr., et.al., "Content Usage Analysis and Recommendations", 52 pages.
Office Action for U.S. Appl. No. 12/570,690, mailed on Aug. 22, 2014, Hilliard B. Siegel, "Dynamic Access to Content Items Based on Venue", 70 pages.
Office action for U.S. Appl. No. 12/570,690, mailed on Nov. 26, 2012, Siegel et al., "Dynamic Access to Content Items Based on Venue", 28 pages.
"Boeing couldn't make a business out of in-flight Internet. AirCell bets it can." Alsever, Jennifer, <<http://money.cnn.com/2007/11/19/smbusiness/wi-fi.fsb/index.htm>>, available as early as Nov. 28, 2007, 2 pages.
"Boeing Selects ScreamingMedia to Supply Online Content to Airborne Travelers", ScreamingMedia Inc., <<http://web.archive.org/web/20010509195703/www01.screamingmedia.com/en/about_us/pr . . . received on Apr. 14, 2009, 2 pages.
"Boeing Signs With ScreamingMedia for In-Flight Web Access" by Tischelle George, Information Week, <<http://www.informationweek.com/news/showArticle.jhtml?articleID=6505757>> available as early as May 7, 2001, 1 page.
"CyberPIXIE offers the most comprehensive solutions available in the market for your high-speed wireless LAN needs.", cyberPIXIE, Inc., <<http://web.archive.org/web/20020604074928/http:/cyberpixie.com/>> available as early as May 22, 2002, 6 pages.
Espinoza et al., "GeoNotes: Social and Navigational Aspects of Location-Based Information Systems", Springer-Verlag Berlin Heidelberg 2001, Ubicomp 2001 Sep. 30-Oct. 2, 2001, LNCS 2201, pp. 2-17.
Johnson, "How the E-Book Will Change the Way We Read and Write", The Wall Street Journal, Apr. 20, 2009, retrieved from the internet at http://online.wsj.com/article/SB123980920727621353.html#printMode, 4 pages.
Non-Final Office Action for U.S. Appl. No. 12/495,009, mailed on Feb. 13, 2012, Francis J. Kane JR. et al., "Recommendation of Media Content Items Based on Geolocation and Venue", 35 pages.
"PCTEL Acquires Wireless LAN Software and Gateway Products" PCTEL, Inc. <<http://web.archive.org/web/20020607225950/www.pctel.com/newsroom/2002/02-05-22.html>>, available as early as May 22, 2002, 2 pages.
"Wireless internet access in-flight, along with complimentary access to the Wall Street Journal, Fodors, etc. while in flight." 2009 Aircell, <<http://www.gogoinflight.com/>> received on Apr. 14, 2009, 2 pages.
Office Action for U.S. Appl. No. 12/495,256, mailed on Jan. 12, 2015, Francis J. Kane, JR., "Recommendations Based on Progress Data", 21 pages.

(56) References Cited

OTHER PUBLICATIONS

Office Action for U.S. Appl. No. 12/495,351, mailed on Oct. 21, 2014, Francis J. Kane, Jr, "Collection of Progress Data", 39 pages.
Office Action for U.S. Appl. No. 12/495,179, Francis J. Kane JR, "Reporting of Content Consumption Progress to Content Purveyors", 60 pages.
Final Office Action U.S. Appl. No. 12/570,690, mailed on Mar. 12, 2015, Hilliard B. Siegel, "Dynamic Access to Content Items Based on Venue", 86 pages.
Final Office Action for U.S. Appl. No. 12/495,179, mailed on Jul. 10, 2015, Francis J. Kane, Jr., "Reporting of Content Consumption Progress to Content Purveyors", 65 pages.
Office action for U.S. Appl. No. 12/495,061, mailed on Aug. 13, 2015, Kane, Jr. et al., "Content Usage Analysis and Recommendations", 58 pages.
Office action for U.S. Appl. No. 12/495,351, mailed on Sep. 16, 2015, Kane et al., "Collection of Progress Data", 3 pages.
Office action for U.S. Appl. No. 12/570,690, mailed on Mar. 29, 2016, siegel et al., "Dynamic Access to Content Items Based on Venue", 79 pages.
Office action for U.S. Appl. No. 12/495,179, mailed on May 3, 2016, Kane Jr. et al., "Reporting of Content Consumption Progress to Content Purveyors", 78 pages.
Office action for U.S. Appl. No. 14/537,483, mailed on Dec. 18, 2015, Kane, Jr. et al., "Recommendation of Media Content Items Based on Geolocation and Venue", 27 pages.
Office action for U.S. Appl. No. 14/537,483, mailed on Oct. 17, 2016, Kane Jr. et al., "Recommendation of Media Content Items Based on Geolocation and Venue", 47 pages.
Office action for U.S. Appl. No. 12/495,179, mailed on Oct. 21, 2016, Kane Jr. et al., "Reporting of Content Consumption Progress to Content Purveyors", 84 pages.
Office action for U.S. Appl. No. 12/495,061, mailed on Nov. 16, 2016, Kane Jr. et al., "Content Usage Analysis and Recommendations", 83 pages.
Office action for U.S. Appl. No. 12/570,690, mailed on Sep. 30, 2016, Siegel et al., "Dynamic Access to Content Items Based on Venue", 86 pages.
Office action for U.S. Appl. No. 14/537,483, mailed on Jun. 3, 2016, Kane Jr. et al., "Recommendation of Media Content Items Based on Geolocation and Venue", 39 pages.
Office action for U.S. Appl. No. 12/495,061, mailed on Jul. 15, 2016, Kane Jr. et al., "Content Usage Analysis and Recommendations", 60 pages.

\* cited by examiner

LOCATION-BASED INTERACTION WITH DIGITAL WORKS

BACKGROUND

The continued proliferation of digital works has led to an increase in the availability of such works, as well as an increase in the availability of electronic devices and applications used for consuming these works. For instance, users consume digital works, such as electronic books (eBooks), digital videos, digital songs, digital images, and the like, on an assortment of electronic devices. As the number of digital works and devices for consuming digital works continues to increase, users are ever more interested in enhancing their experiences while consuming and enjoying these works.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
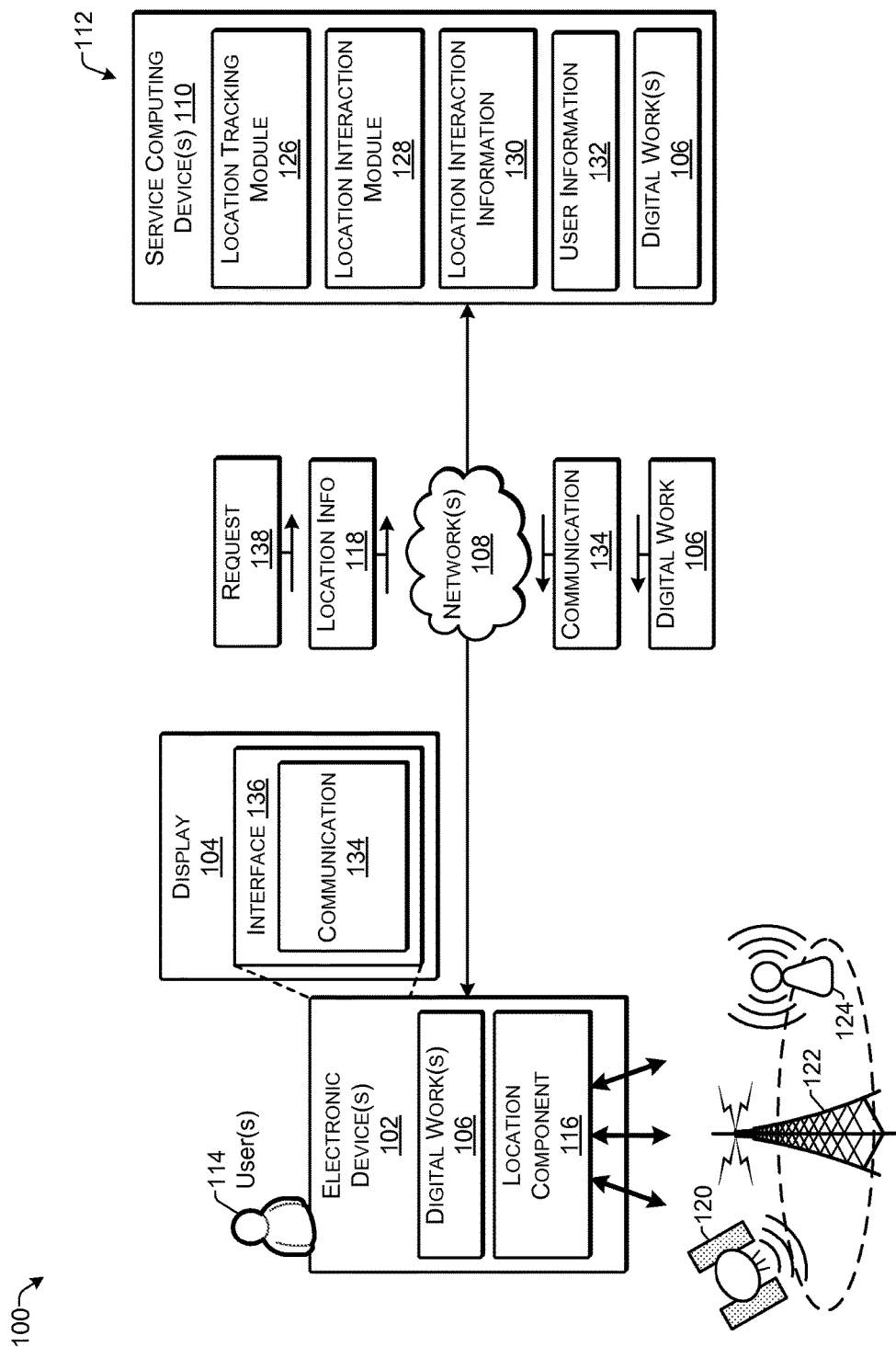
FIG. 1 illustrates an example framework for location-based interaction with digital works according to some implementations.

This disclosure includes techniques and arrangements for location-based interaction in connection with a digital work. For example, a service provider may determine a location of an electronic device. In some cases, the electronic device may provide location information that can be used to determine a physical location of the electronic device. In other cases, the service provider may determine the location of the electronic device based on an origination point of communications received from the electronic device. In some examples, a first user may virtually leave a digital work at a location and the digital work may be subsequently acquired at the location by a second user. For instance, when the service provider determines that an electronic device of the second user is at the particular physical location, the service provider may send a communication to the second user to notify the second user that one or more digital works were virtually left at the particular location and are available to be accessed, downloaded, or the like, if the second user so desires. Additionally, in some cases, one or more conditions may be attached or enforced for allowing access to the digital work. For example, the second user may be limited to accessing the digital work only so long as the user remains at the current location or remains within a specified geographic region. The conditions may be set by one or more of a user, the service provider, the publisher of the digital work, the author of the digital work, and so forth.

As another example, suppose that the service provider determines that an electronic device of a user is at a particular physical location. For example, the user may attend an event, such as a sporting event, a theater production, a concert, a ballet, a circus, etc. Upon determining, based on the determined location of the electronic device that the user has arrived at a venue of the event, the service provider may send a communication to the electronic device to inquire whether the user would like to access, on the electronic device, an event program or other eBook or digital work related to the event.

Alternatively, in some examples, the service provider may offer a promotion or deal to one or more users that go to a specified location. For example, in response to notification of a promotion, the user of an electronic device may go to a specified location and send location information to the service provider, such as by checking in with the service provider from the specified location. In response, the service provider may send a digital work, a reward, a coupon, or other promotional item to the electronic device as part of a promotion, or the like. Similarly, in some cases, the user may opt-in to receiving special offers in communications from the service provider. Accordingly, when the service provider determines that the user is at a particular location, the user may receive a special offer from the service provider, such as for a discount on goods or services offered by a nearby business or merchant.

Additionally, in some implementations, when the service provider has determined the location of an electronic device of a user, the service provider may send a communication to the user that informs the user of the last work consumed at the location. For example, the location may be a room, such as in a hotel, a restaurant, a coffee shop, or other business, or even a particular chair, such as a chair in a public place. The communication may also invite the user to check in and provide information to let the next person know what digital work the user was consuming at the location.

For discussion purposes, some example implementations are described in the environment of enabling interaction with digital works and/or other users of electronic devices based, at least in part, on location information. However, the implementations herein are not limited to the particular examples provided, and may be extended to other types of interactions, items, promotions, situations, and the like, as will be apparent to those of skill in the art in light of the disclosure herein.

Example Framework for Location-Based Interaction

FIG. 1 illustrates an example framework 100 for location-based interaction, such as in connection with a digital work, according to some implementations. In the illustrated example, the framework 100 includes at least one electronic device 102. The electronic device 102 may be implemented as any of a number of different types of electronic devices, as discussed further below. In some examples, the electronic device 102 may include a display 104. For instance, the display 104 may be used for displaying a digital work 106, a user interface, application data, communications, or numerous other types of information, images, data, and the like. In some examples, the display 104 may be part of the electronic device 102 and/or unitary with the electronic device 102. In other examples, the display 104 may be separate from the electronic device 102 and connected to or coupled with the electronic device 102.

The electronic device 102 is able to communicate over one or more networks 108 with one or more service computing devices 110 of a service provider 112 that enable location-based interaction with digital works and/or with other users of other electronic devices 102. For instance, the electronic device 102 may communicate with the service computing device 110 of the service provider 112, to access or receive at least one digital work 106 over the network(s) 108. For example, the network(s) 108 may include a local area network (LAN), a wide area network (WAN), such as the Internet, or any combination thereof, and may include both wired and wireless communication technologies using any suitable protocols and communication techniques. The computing device 110 of the service provider 112 and the electronic device 102 of a user 114 may communicate and interact with one another using any combination of suitable communication and networking protocols, such as Internet protocol (IP), transmission control protocol (TCP), hypertext transfer protocol (HTTP), and so forth. In some cases, the electronic device 102 may access or download one or more digital works 106, while in other cases the one or more digital works 106 may be streamed to the electronic device 102.

The electronic device 102 may include a location component 116 that enables the service computing device 110 to determine a physical location of the electronic device 102. For example, in some cases the location component 116 may actively provide location information 118 to the service computing device 110. Thus, in some examples, the location component 116 may include or may receive data from a Global Positioning System (GPS) device that determines GPS location information from one or more GPS satellites 120. The location component 116 may send the GPS location information to the service computing device 110 as the location information 118 on a periodic basis. As another example, the location component may actively determine the location of the electronic device 102 based on proximity to one or more of at least one cellular communication tower 122 and/or at least one wireless access point 124. The location component 116 may send the location information so obtained on a periodic basis to the service computing device 110 as the location information 118. Further, the location information 118 may include at least an identifier of the electronic device 102 that positively identifies the electronic device 102 in a manner that distinguishes each electronic device 102 from other electronic devices 102.

In other examples, the electronic device 102 may not actively report any location information to the service computing device 110. Instead, the service computing device 110 may actively determine the location of the device 102, such as based on receiving communications from the electronic device 102 from a particular cell tower 122 or wireless access point 124. For instance, the location component 116 may merely include a communication interface that communicates with the service computing device 110. Based on a source or origin point of the communications through the network 108, such as an identified cell tower, wireless access point, an IP (Internet Protocol) address, or the like, a location management module 126 on the service computing device 110 may identify a current location of the electronic device 102. Such tracking by the location management module 126 may typically only be performed at the request of the user 114 for utilizing the service provided by the service provider 112. For instance, the user 114 may be required to opt-in to utilize the location interaction service before any location tracking may take place. Accordingly, based on the preferences of the user 114, the location tracking module 126 may use information acquired from the electronic device 102 and/or from one or more third party entities or devices as location information 118 for determining at least an approximate location of the electronic device 102.

Regardless of whether the location of the electronic device 102 is actively determined by the electronic device 102 or by the service computing device 110, location information 118 is received by the location tracking module 126 and provided to a location interaction module 128 that provides location interaction services to the electronic device 102 based on a detected location. For example, the location interaction module 128 may compare a detected location with location interaction information 130 and/or user information 132 to determine whether any services are offered or associated with a particular current location of the electronic device 102.

Further, the electronic device 102 may be determined to be at a location when the electronic device 102 is located within a vicinity or within a threshold distance of a location designated in the location interaction information 130. For example, in the case that GPS positioning information is available, the location of the electronic device 102 may be a geospatial location that indicates one or more of latitude, longitude or altitude. Thus, the electronic device 102 may be at a particular location or within the vicinity of a particular location when the electronic device 102 is within a threshold distance from a specified latitude, longitude and/or altitude. On the other hand, if GPS positioning information is not used or not available, the electronic device 102 may be at a location or within a vicinity of a location when the electronic device 102 is within communication range of one or more cellular communication towers 122, one or more wireless access points 124, or the like.

As an example, suppose that the user takes the electronic device 102 to a particular venue, such as a sports stadium, that includes a wireless access point 124. Upon detecting the wireless access point 124, the location component 116 may determine the location of the electronic device 102 as being within the vicinity of the sports stadium venue. Similarly, in the case that the electronic device 102 is able to communicate with several cellular communication towers 122, the location component 116 may determine an approximate location of the electronic device 102 based on relative signal strengths of the cellular communication towers 122. Thus, the location component 116 on the electronic device 102 and/or the location tracking module 126 at the service computing device 110 may determine whether the electronic device 102 is close enough to a particular location to be at or within the vicinity of a designated location to meet conditions for accessing a particular service, such as for obtaining a digital work 106, or the like. Consequently, the threshold distance for determining that an electronic device 102 is at a location or within the vicinity of a location may depend at least in part on the techniques used for determining the location of the electronic device 102 and any conditions set for obtaining a service in relation to a particular location.

Upon determining that a service is available for a current location of the electronic device 102, the location interaction module 128 may send a communication 134 to the electronic device 102 over the network 108. For instance, the location interaction module 128 may send a communication based on the particular detected location of the electronic device 102 to invite the user 114 of the electronic device 102 to take advantage of a specified service, offer, or the like, associated with the current location of the electronic device 102. The electronic device 102 may receive the communication 134 and display the communication in an interface 136 on the display 104 of the electronic device 102. In some examples, the communication 134 may be displayed by an application or module executing on the electronic device 102, such as for displaying one or more digital works 106. In other examples, the communication 134 may include any of an email, a text message, a telephone or voice mail message, an instant messaging service message, a message sent within a social network framework, such as Facebook®, a message sent through a microblog service, such as Twitter®, and so forth. Upon receipt of the communication 134, the user 114 may decide whether to take advantage of the service provided by the service provider 112.

As one example, a first user may leave a digital work at a particular location to be picked up or otherwise acquired or accessed by a second user when the second user is at the particular location. For instance, the digital work may be an eBook that was last read at the particular location, such at a particular room in a hotel, a particular coffee shop, restaurant, etc., by another user who decided to donate, lend or otherwise provide the book to the next user that arrives at the particular location. In some examples, the first user may not know the second user, while in other examples the first user and the second user may be affiliated through a social network, a microblog account, or other pre-existing affiliation. Accordingly, if the second user desires to obtain the digital work, the user may send a request 138 for the work. In response, the service computing device 110 may make the digital work 106 available for the electronic device 102 of the second user to access, such as by making the digital work available for delivery to be downloaded by the device 102 of the second user.

Further, in some examples, the first user may leave a chain of digital works in a number of different locations to which the second user may go to obtain the digital works as part of a game, challenge, puzzle, or the like, such as by following clues provided by the first user. For example, the first user may leave a portion of a digital work at each location of a plurality of locations, and the second user may follow the clues to locate each next portion of the digital work to continue reading or consuming the digital work until complete.

As another example, an author of a digital work may virtually leave a copy of the digital work at a particular location for the next user of an electronic device 102 who arrives at the location. For instance, suppose that the author is offering signed copies of a digital work, and the current location of the author may be made temporarily visible to other users, or may be broadcast to other users who would like to obtain a signed copy of the author's work. Accordingly, one or more users 114 may determine a current location of the author and go to the location to obtain a signed copy of the author's work. For example, when the service provider determines that a particular user is at the same location as the author, such as based on location information 118, the service provider computing device 110 may download a signed copy of the digital work. As another example, as a promotion, the author may virtually leave a certain number of copies of a digital work available, such as for free, to the first certain number of users that arrive at a particular physical location at which the author is currently located or was recently located. In some cases, the location may correspond to an opening scene in the digital work.

Alternatively, in some examples, the communication 134 may be part of a promotion or special offer provided by the service provider 112 to one or more users that go to a specified location. For example, the user of the electronic device 102 may go to a specified location and check-in by sending location information 118 to the service provider. In response, the service provider may send a digital work, a reward, a coupon, or other item to the electronic device 102. Similarly, in some cases, the user may opt in to receiving special offers from the service provider. Accordingly, when the user is at a particular location, the user may receive a special offer from the service provider 112, such as for a discount on goods or services offered by a nearby business or merchant.

As mentioned above, the user 114 of the electronic device 102 may be required to opt-in to the location-based services provided by the service provider 112. Accordingly, the user 114 may be given the opportunity to set preferences for features such as: when and under what conditions the service provider 112 will perform location tracking of the user's electronic device 102; when and under what conditions the user's electronic device 102 will receive communications 134; how the communications 134 will be presented on the electronic device (e.g., as an overlaid interface, via email, text message, etc.); and the types of communications that will be provided to the electronic device, such as whether the communications may include promotions, or the like. Furthermore, in some examples, rather than sending a communication 134 prior to making the digital work available for download, the service computing devices may send the digital work 106 with the communication, or may send the digital work 106 as the communication.

Example Interfaces

Figure 2:
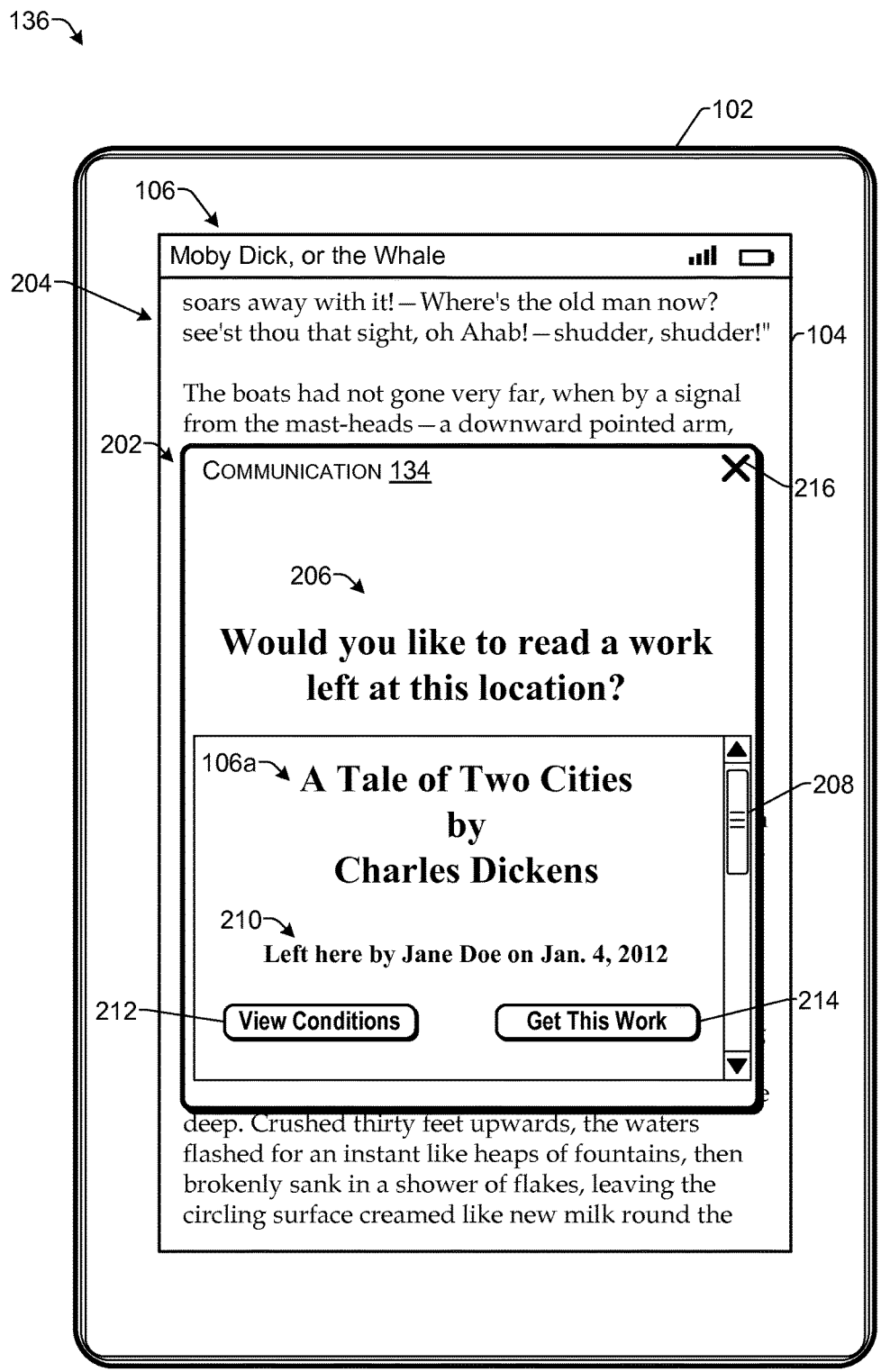
FIG. 2 illustrates an example device including an interface to receive a communication for location-based interaction in connection with a digital work according to some implementations.

FIG. 2 illustrates an example of the interface 136 for displaying a communication 134 received from the service provider 112 on an example electronic device 102 according to some implementations. The electronic device 102 may be implemented as any of a number of different types of electronic devices, as discussed further below, able to display, render, play or otherwise present a digital work 106. Further, in some types of electronic devices 102, the display 104 may be a touch-sensitive display configured with a sensor to sense a touch input received from an input effecter, such as a finger of a user, a stylus, or the like. Thus, the touch-sensitive display may receive one or more touch inputs, stylus inputs, page swipes, and so forth.

In other implementations, the display 104 may be non-touch sensitive. Accordingly, in addition to, or as an alternative to, a touch sensitive display, the electronic device 102 may include various external controls and input devices. For example, some implementations of the electronic device 102 may include a virtual or physical keyboard, a mouse, a pointing stick, a touchpad, a trackball, a joystick, a remote control, buttons and/or various other controls for performing various desired inputs and interactions with the electronic device 102 and a digital work 106 or interface displayed on the display 104. Additionally, in other implementations, one or more voice commands may be used to control or interact with the digital works or interfaces herein. Further, in some examples, a user's eye position or point of focus may be detected to serve as inputs or commands. Thus, implementations herein are not limited to any type of input devices, techniques, or controls.

In some examples, the digital work 106 and other digital works described herein may be an electronic book (eBook) having one or more pages of text. For example, the display 104 may depict the text of the eBook and also any illustrations, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of digital works include, but are not limited to, books, magazines, newspapers, periodicals, journals, reference materials, textbooks, anthologies, instruction manuals, proceedings of meetings, forms, directories, programs, web pages, plays, screen plays, closed captioning transcripts of movies and television shows, song lyrics, and so forth. Accordingly, the terms "book" and/or "eBook" may include any readable or viewable textual content that is in electronic or digital form. Additionally, implementations of the digital works 106 and other digital works described herein are not limited to eBooks or digital text, but may also include other types of digital works, such as digital audio (e.g., music, songs, audible books, etc.), digital video (e.g., movies, television, short clips, etc.), images (e.g., art, photographs, etc.), and other multi-media content.

In the illustrated example, the interface 136 may include an area or window 202 that may be displayed on the display 104 of the electronic device 102. In some examples, the window 202 may be a pop-up window that may be overlaid on top of an interface 204 currently presented on the display 104. For example, suppose that the user is viewing a digital work 106 on the device 102 and the communication 134 is received from the service provider 112. An application or module that is presenting interface 204 and the digital work 106 on the display 104 may enable the window 202 to be overlaid on the presentation of the digital work 106. As another example, the electronic device 102 may receive an audio or visual notification of the communication 134, and the user may select an icon or application to view or hear the communication 134.

As another example, rather than overlaying the window 202 on an application that the user is currently using, the communication 134 may be presented overlaid on or in place of a screen saver that is presented when the user closes an application or stops using the device. For example, in the case that the display 104 is an electronic paper display, when the user turns off the device 102, a image is typically displayed on the display 104 while the device is in the off condition. Accordingly, the communication 134 may be presented overlaid on top of the image displayed while the device is in the off condition.

In some examples, such as when a window 202 is overlaid on another interface, the window 202 may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. A widget may run as a stand-alone application, i.e., is able to run outside of a web browser, and the runtime environment in which a widget is run may be referred to as a widget user agent. A widget user agent may be specifically enabled for running widgets, or a more generic user agent (e.g., a web browser or other application) may run a widget. See, e.g., W3C.org, Working Group Note 27 Sep. 2011 for additional description of widgets. The W3C is an international community that develops open standards for use on the World Wide Web. Further, widgets, HTML, JavaScript®, and CSS are just several examples of technologies for displaying the interfaces and windows described herein, and numerous other possible techniques, tools, functionalities, programming technologies, and the like will be apparent to those of skill in the art in light of the disclosure herein.

In the example of FIG. 2, the communication 134 is presented to the user in the window 202. For instance, suppose that the communication 134 includes a message 206 that invites the user to read one or more digital works left (virtually) at the user's current location, such as by another user. As one example, a first user may virtually leave a digital work at a location, such as by designating the digital work to be available at the location for access or download by another user who arrives at the location or within a predetermined distance of the location. Additionally, in some examples, a plurality of digital works may be left at a particular location and, accordingly, the user may be able to scroll through the digital works left at the particular location such as by using a scrollbar 208 or other functionality. Furthermore, in some examples, the name of the person who left the work and the date on which the work was left may be identified, as indicated at 210, while in other examples, the person leaving the work may remain anonymous, and the date may or may not be shown.

If the user desires to acquire one of the digital works 106a left at the location, the user may view any conditions attached to obtaining or accessing the digital work by selecting a "view conditions" button 212. For example, in some cases the conditions may stipulate that the user must read or otherwise consume the digital work 106a at the particular location, such as at a particular hotel, particular coffee shop, restaurant, business, or the like. As another example, the conditions may stipulate that the user must leave the digital work at the particular location or at some other specified location following consumption of the digital work 106a.

A single party may set the one or more conditions, or multiple different parties may set the one or more conditions. For example, the publisher of a digital work may set conditions, such as that the digital work may only be accessed by a resident of a particular country, or made available to a user account associated with a particular country. For instance, a first publisher may have exclusive rights to distribute a digital work in a first country, and a second publisher may have exclusive rights to distribute the digital work in a second country. As another example, the publisher or the service provider may set conditions based on the content of the digital work, such as that the age of the user associated with the user account accessing the digital work must meet a certain minimum age for the digital work. As still another example, the donating user may also set certain conditions, and these conditions may be stipulated to the service provider when notifying the service provider that a digital work is being left in a location for other users. Further, in other examples, there may be no conditions attached to obtaining or accessing the digital work 106a. Numerous other variations will be apparent to those of skill in the art having the benefit of the disclosure herein.

If the user desires to obtain one of the available digital works 106a, the user may select a "get this work" button 214, which may result in delivery of the digital work 106a to the user's electronic device 102, or which may direct the user to another interface to access the digital work 106a. Alternatively, if the user does not desire to obtain any of the available digital works, the user may select an "X" 216 to close the window 202.

Figure 3:
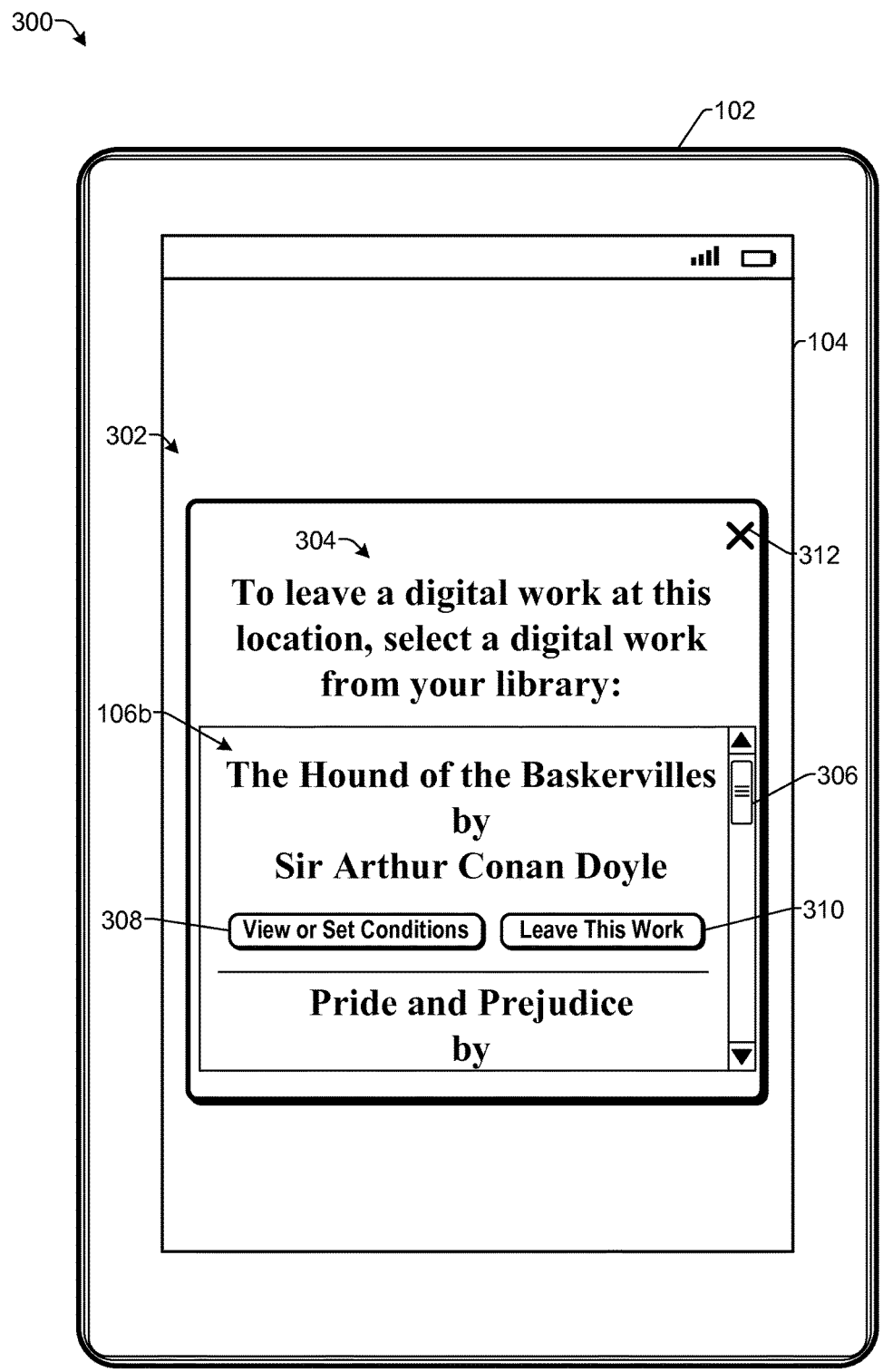
FIG. 3 illustrates an example device including an interface for leaving a digital work for location-based interaction according to some implementations.

FIG. 3 illustrates an example interface 300 that may be presented to a user of the electronic device 102 for leaving a digital work at a particular location according to some implementations. For example, suppose that the user (i.e., a donating user) has finished reading or otherwise consuming a particular digital work 106b and desires to leave the digital work at a particular location. As one example, suppose that the user vacationed in western England and, during the vacation, the user read *The Hound of the Baskervilles* by Sir Arthur Conan Doyle. The user may desire to leave the digital work 106b for the next interested person who stays at the same hotel at which the user stayed. Accordingly, the user may access the user interface 300 and may be presented with a window 302 including a message 304 that invites the user to select a digital work from the user's digital work library to leave at the current location of the user's electronic device 102. The user may use a scrollbar 306 or other functionality to scroll through the digital works available in the user's digital work library to locate the digital work 106b. When the donating user has located the digital work 106b in the donating user's digital work library, the user may select a "view or set conditions" button 308 to view or set conditions associated with making the digital work 106b available to other users at the current location. For example, the service provider 112 may set conditions, such as that the digital work 106b will be removed from the library of the donating user and will no longer be available for access by the user.

In some examples, the virtual leaving of a digital work at a location by the donating user may be a form of lending the digital work. For instance, the digital work may be left at the location and may be inaccessible to the donating user for a predetermined period of time or until another user accesses the digital work from the location and returns or discards the digital work. In some cases, the other user may have a set period of time in which to complete consumption of the digital work before the digital work reverts back to the original donating user. In other examples, by leaving the digital work at the location, the donating user may give up all rights and interest in the donated digital work 106b. For example, the donating user may have obtained the digital work 106b from the service provider 112, such as through a license agreement that enabled the donating user to maintain a copy of the digital work 106b on the user's electronic device 102. Accordingly, by agreeing to leave the digital work at the location, the user may relinquish and/or terminate the license agreement and no longer maintain a copy of the digital work 106b on the user's electronic device 102 under the previous license.

Furthermore, in some examples, the donating user or the service provider 112 may set conditions under which a subsequent user may access or obtain the digital work 106b. For example, the service provider 112 may stipulate that the digital work 106b may be obtained by the subsequent user under a license similar to that under which the digital work 106b was originally obtained by the original donating user. Furthermore, the donating user or the service provider 112 may set additional conditions such as that the digital work must be consumed within a specified period of time, at a specified location, within the bounds of a specified geographic region, and so forth. As another example, in the case that the digital work is a video, such as a movie, the subsequent user may be required to watch the movie before leaving the particular location. Similarly, in the case that the digital work is a song, album, audio recording, or the like, the subsequent user only may be able to listen to the recording within a specified location or a specified geographic area. For instance, if the subsequent user leaves the geographic area, the subsequent user may agree that the digital work can be removed automatically from the user's device and left at the location for another subsequent user. Various other example conditions are described elsewhere herein. Further, other possible conditions may be apparent to those of skill in the art in view of the disclosure herein.

When the donating user has located the work 106b and accepted or set the conditions for leaving the digital work 106b, the user may select a "leave the work" button 310 to initiate a process to virtually leave the work at the current location. For example, as discussed additionally below, the location information of the user's current location, the identity of the digital work 106b, and any conditions selected by the donating user, may be sent to the service computing device 110 and received by the location interaction module 128. For example, the location tracking module 126 may determine the location of the electronic device 102 from the location information 118, as discussed above with respect to FIG. 1. The location interaction module 128 may store, in the location interaction information 130, the identity of the digital work 106b, the location information 118, the identity of the donating user, and any conditions set by the donating user. Furthermore, the location interaction module 128 may access the user information 132 to remove the digital work 106b from the electronic device 102 of the donating user and any from other electronic devices 102 associated with a user account of the donating user.

Accordingly, when a subsequent user is detected as being present at the specified location i.e., at the hotel in western England in the example given above, the location interaction module 128 may send a communication 134 to the electronic device 102 of the subsequent user to invite the subsequent user to obtain the digital work 106b in the manner discussed above with respect to FIG. 2, if the subsequent user so desires.

Alternatively, the donating user may decide not to leave the digital work 106b at the current location. Accordingly, the user may close the interface 300, such as by selecting the "X" 312, or by other suitable techniques. Furthermore, in some examples herein, the donating user need not be physically present at the location at which the donating user desires to leave the digital work 106b. For example, the donating user may select a location to leave the digital work 106b from a map or other user interface (not shown in FIG.

3). As one example, the donating user may virtually visit the location through a website interface or the like.

As another example, the donating user may be part of a group such as an online group or affiliation in which users present a challenge to one another to travel to a particular physical location to obtain a digital work that has been virtually left at the particular location. For example, a donating user may leave a digital work at a particular location and post the GPS coordinates of the particular location on a website, or provide the location coordinates to the group of users in some other suitable manner. One or more users in the group may then travel to the particular location to attempt to locate and obtain the digital work. When an electronic device 102 of one of the users is detected as being at the particular physical location, a communication 134 may be provided to the electronic device 102 to notify the user that the digital work is available for download.

Furthermore, in some implementations, the donating user may leave a barcode, such as including a digital work identifier number such as ASIN (Amazon Standard Identification Number), an ISBN (International Standard Book Number), or the like, at the particular location. For example, the user who arrives at the location may take an image of the barcode with a camera or the like, and provide the image to the service provider to obtain the digital work. The barcode may be a one-dimensional or two-dimensional barcode, or any other suitable type of encoded information. As another alternative, rather than a barcode, the ASIN or ISBN may be printed on a piece of paper or other surface, and the number itself may be provided to the service provider 112, either as an image or as a text entry.

Further, in some cases, the user may first need to find a clue, solve a puzzle, answer a question, or the like, to access or utilize the barcode. For example, the user may need to answer one or more questions related to the digital work to which the barcode applies before the barcode will operate to access the digital work for the user.

As another example, the first user and the second user may be affiliated through a social network, such as Facebook® and/or through a microblog account, such as Twitter®. For example, suppose that the first user and the second user are friends or friends of friends on a social network, while a third user is not. Further, suppose that the conditions for obtaining the digital work at the location may limit the work to friends and/or friends of friends of the donating first user. Accordingly, when the second user arrives at the location, the service provider may, from user information 132, identify the second user as a friend of the first user and send the second user a communication 134 offering to make the digital work available for delivery. On the other hand, when the third user arrives at the location, the service provider may determine from user information 132, that third user is not a friend or a friend of a friend of the donating user, and thus, the service provider does not send a communication to the third user.

Example System Architecture

Figure 4:
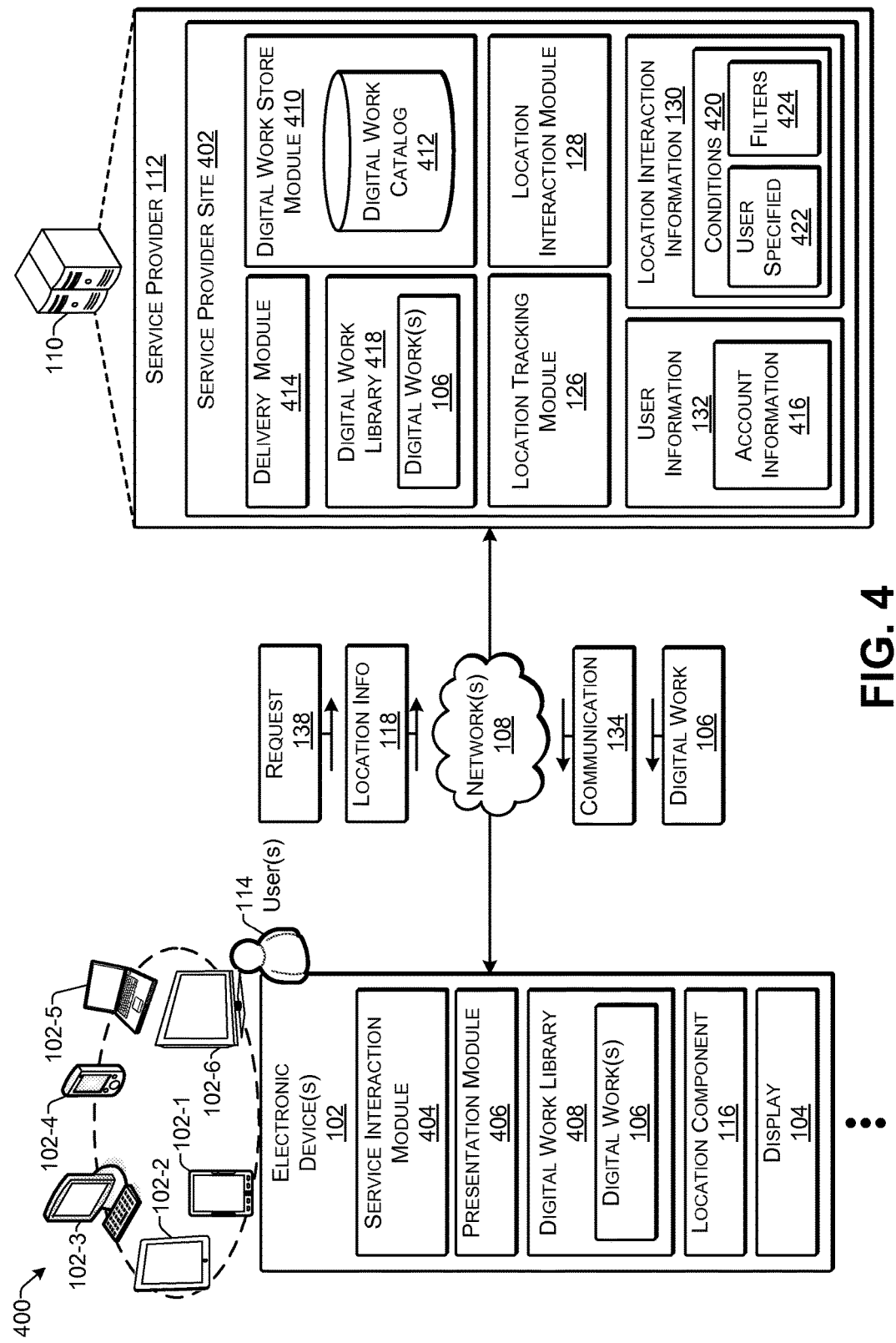
FIG. 4 illustrates an example system architecture for location-based interaction in connection with a digital work according to some implementations.

FIG. 4 illustrates an example architecture of a system 400 for location-based interaction in connection with a digital work according to some implementations. In some examples, one or more users 114 may be associated with one or more electronic devices 102 capable of displaying, rendering, playing or otherwise presenting one or more digital works 106. Some examples of the electronic device(s) 102 may include digital media devices and eBook readers 100-1, tablet computing devices 102-2, desktop, terminal and workstation computing devices 102-3, smart phones and mobile devices 102-4, laptop and netbook computing devices 102-5, televisions, gaming systems and home electronic devices 102-6, and any other device capable of accessing and rendering or playing digital works, online content, mobile content, textual content, multimedia content, or the like. For example, in the case that the digital work includes a visual content portion, such as in the case of an eBook, video, or an image, the visual content may be presented on the display 104 of the electronic device 102. In other examples, such as when the content is purely audio, the presentation may be an audio presentation provided through speakers, headphones, (not shown in FIG. 4) or the like, of the electronic device 102.

Further, the device 102 need not necessarily be a mobile device according to some implementations herein. For example, a user 114 may access one or more digital works and or interfaces, such as described above with respect to FIGS. 1-3, from a stationary device at a particular location. As one example, a user 114 may access the user's account with the service provider 110 through a device 102, such as desktop computer or network capable television owned by a hotel or other business.

In the illustrated example, the electronic device 102 is able to communicate with the service provider 112. For instance, the electronic device 102 may communicate with one or more service computing devices 110 of the service provider 112, to access or receive at least one digital work 106 over one or more networks 108, as described above. The service provider 112 may maintain an online location or site 402, such as a merchant website, an e-commerce site, or other functionality that offers one or more digital works 106 to the public. In some implementations, the service provider site 402 may be hosted on one or more of the service computing devices 110. In some cases, the service computing devices 110 may be one or more web servers located at a data center, server farm, or other single physical location. In other cases, the service provider site 402 or portions thereof may be located in diverse locations that are physically remote from one another. Further, in some implementations, the service provider site 402 may be a group of websites, data stores, services, and the like, hosted on a plurality of different service computing devices 110 in a plurality of diverse locations, or hosted by one or more service computing devices 110 at a single location.

In some implementations, the service provider site 402 may offer digital works 106, such as books, magazines, newspapers, songs, movies, and so forth, to the public through an online presence accessible by a web browser. In some examples, the service provider site 402 alternatively, or additionally, may provide digital works 106 through an online or mobile application executing on the electronic device 102. For example, an application on the electronic device 102 may connect to or obtain content from the service provider site 402 to enable the purchase or management of access to digital works 106, and the like. Thus, the service provider site 402 may enable the electronic device 102 to access digital works 106 through an online or mobile application executing on a mobile device, such as an eBook reader, smart phone, tablet computing device, or the like. Accordingly, the service provider site 402 is not limited to a website accessed by a browser, but may encompass other technologies for obtaining digital works 106, such as through in-application shopping, and the like.

The electronic device 102 may include a service interaction module 404, which in some instances may be an application, such as a web browser, mobile application, or other module or computer program configured to receive web content, webviews, online content, or the like, for accessing and interacting with one or more modules of the service provider 112. For example, the service interaction module 404 may enable a user 114 to shop for digital works 106 at the service provider site 402 and access or receive digital works 106 from the service provider site 402, such as by downloading through the network(s) 108. Further, in some implementations, the service interaction module 404 may enable the user 114 to organize or manage the digital works 106 on the electronic device 102, while in other implementations, a separate management module (not shown) may provide this functionality.

The electronic device 102 may include a digital work presentation module 406 and a digital work library 408 that may include at least one digital work 106. In some implementations, the digital work presentation module 406 and the service interaction module 404 may be separate modules or applications. In other implementations, the digital work presentation module 406 and the service interaction module 404 may both be part of the same application or computer program for accessing and displaying content on the electronic device 102. In yet other implementations, the digital work presentation module 406 and the service interaction module 404 may represent different functionalities of the same module. As one example, the digital work presentation module 406 may display visual content of a digital work 106 on the display 104 and or play audio content of a digital work 106 on one or more speakers (not shown in FIG. 4). Further, each instance of a digital work 106 may be made up of any number of files or may be a single file. For example, the content of a digital work 106 may be stored on the electronic device 102 as one or more files separate from one or more files including the metadata of the digital work. Alternatively, however, in other examples, the content and the metadata may be stored as a single digital work file.

The service provider site 402 may include a digital work store module 410 that may provide or may access a digital work catalog 412. For example, the digital work store module 410 may present the digital work catalog 412 to a service interaction module 404 of an electronic device 102 that accesses the service provider site 402 to shop for a digital work 106. The digital work catalog 412 may include searchable and/or browsable listings and descriptions of digital works 106 available from the service provider site 402. The digital work store module 410 may communicate with the service interaction module 404 on the electronic device 102 to enable the user 114 to locate and acquire a digital work 106 from the service provider site 402.

The service provider site 402 may further include a delivery module 414 that may deliver a digital work 106 to the electronic device 102 and/or the user 114. For example, in some instances, the delivery module 414 may facilitate the download of a digital work to the electronic device 102 over the network(s) 108. In other instances, the delivery module 414 may provide for delivery of a hard copy of a digital work to the user, such as by delivery of a recording medium that maintains a copy of the digital work, depending on the nature of the digital work and the electronic device 102.

Furthermore, in some implementations, the delivery module 414 may refer to user information 132 to determine one or more digital works 106 to download to the electronic device 102. For example, the user information 132 may include account information 416, such as user contact information, a purchase history, a user library, or other records of digital works purchased or acquired by the user 114, as well as other transactions with the user 114, for a plurality of users 114 of the service provider site 402. Accordingly, in some cases, the delivery module 414 may assist in synchronizing the content of multiple devices 102 of a single user or a single user account, such as for delivering and synchronizing multiple instances of a particular digital work 106 on multiple devices 102 associated with a single account.

Further, the account information 416 may include additional information for each user for identifying and interacting with the user, such as name, email address, mailing address, telephone number, user identification (ID) number, user purchase history (e.g., digital works and other items or products acquired by the user from the service provider 112) and so forth. In addition, in some examples herein, the user information 132 may include, at least temporarily, a reference to location interaction information 130 for the particular user, if any.

The service provider site 402 may also include or may access a digital work library 418. For example, the digital work library 418 may include a plurality of digital works 106 that the service provider 112 has available for access by electronic devices 102, such as by purchase through the digital works catalog 412.

The service provider site 402 may also include various other site components as is known, depending on the design and intended use of the service provider site 402. For example, other site components may include one or more pages of content, such as webpages, webviews, or other online content, that may be presented to the user 114 through the service interaction module 404, such as during shopping for digital works 106 from the service provider site 402.

In some examples, when the user 114 of the electronic device 102 accesses, purchases or otherwise obtains a particular digital work 106, such as through interaction with the service provider 112, the service provider 112 may make the particular digital work 106 available for delivery to the electronic device 102. Accordingly, the digital work 106 may be downloaded directly from the service provider 112. Alternatively, in some implementations, a copy of the digital work 106 may be provided to a third party, such as a wireless provider that sends the digital work 106 to the electronic device 102. Accordingly, an intermediary, such as a wireless network provider (not shown), or the like, may make the digital work 106 available to a particular electronic device 102, or may otherwise provide the digital work to the particular electronic device 102. For purposes of this disclosure, "providing" or "making available" by the service provider may include any intermediaries that perform delivery of the digital works.

The service provider site 402 may further include the location tracking module 126 and the location interaction module 128 that may be employed in some implementations for providing and/or enabling the location-based interactions described herein. For example, as described above, the location tracking module 126 may determine a location of a particular electronic device 102, while the location interaction module 128 may determine from location interaction information 130 whether any digital works or communications are available for the particular electronic device based on the particular location. In addition, the location interaction information 130 may include conditions 420 that may apply to particular digital works 106, such as user specified conditions 422 that may have been set by a particular donating user or conditions set according to a group of users, such as members of a social network, members of a geo-caching-type group, or the like.

Furthermore, the conditions 420 may further include conditions or eligibility filters 424 set by the service provider 112 and/or the publisher of a digital work. For example, the publisher of a digital work may set eligibility filters 424 that may be applied to prevent or limit access to a digital work in some situations. For instance, a publisher that operates in a first country may have exclusive rights to distribute a particular digital work in the first country, while a different publisher may have exclusive rights to distribute the digital work in a second country. Accordingly, the service provider may have an agreement with the publisher that an eligibility filter 424 will be automatically applied so that a particular digital work may only be accessed by a resident of a particular country or geographic region, or made available to a user account associated with a particular country or geographic region. As another example, the publisher or the service provider may set eligibility filters 424 based on the content of the digital work, such as that the age of the user associated with the user account accessing the digital work must meet a certain minimum age for the digital work. Numerous other types of filters 424 may be applied based on various other considerations, such as information contained in user profiles, user reputations within a community of users, a service level or type of user account (e.g., standard account vs. premium account), and the like.

Further, each user 114 may have one or more electronic devices 102 that are able to access the user's library 408 of digital works. Accordingly, in some cases, a plurality of electronic devices 102 may be registered to a single user account, information about which is maintained in the account information 416. For instance, a particular digital work library 408 may correspond to a respective particular user account. Thus, the user of the particular user account may access a digital work 106 associated with a single user account on more than one electronic device 102, and the digital work 106 may be synchronized across the user's devices 102, so that, for example, when the user opens the digital work 106 on a different device 102, the user may be presented with a page or location at which the user previously stopped reading or otherwise consuming the digital work. Consequently, while the conditions 420 for obtaining a particular digital work 106 may serve to limit the user's access or control over the digital work, such as by limiting access to a particular geographic location, the user may still be able to access the particular digital work on multiple user devices 102, so long as the other conditions for accessing the particular digital work are still met.

Example Promotion Framework

Figure 5:
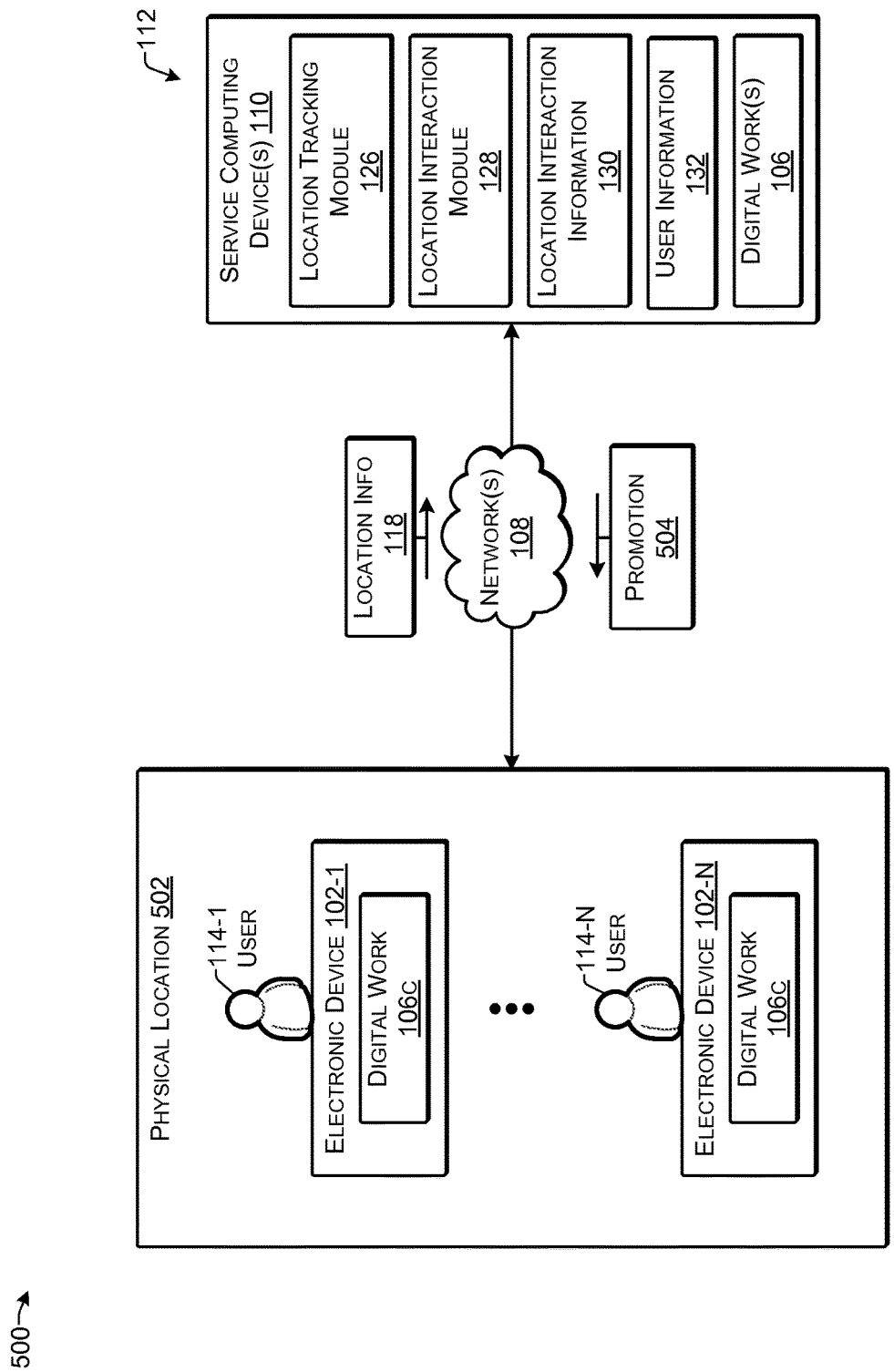
FIG. 5 illustrates an example architecture for location-based interaction for receiving a promotion according to some implementations.

FIG. 5 illustrates an example framework 500 for location-based interaction for receiving a promotion in connection with a digital work according to some implementations. As one example, suppose that the service provider 112, an author, a business, or other entity is sponsoring a promotion in association with a particular digital work 106c. For example, suppose that the promotion provides that every user 114 who shows up to a particular physical location 502 at a particular date and time, and who is reading the particular digital work 106c, e.g., has the digital work 106c present on their electronic device 102, may receive the promotion 504. The promotion 504 may be any suitable offer or deal, such as a signed note or photograph from the author of the digital work 106c, an autographed copy of the digital work 106c, a discount on a future purchase of a digital work by the same author, or any other suitable promotion sponsored by the service provider 112, the author, a business at the physical location 502, or the like.

A first user 114-1, . . . , to an Nth user 114-N, each having a corresponding electronic device 102-1, . . . , 102-N, may each travel to the physical location 502. Location information 118 for each electronic device may be provided to the location tracking module 126 of the service provider computing device 110. Furthermore, as mentioned above, the location information 118 may include an identifier that identifies each electronic device 102 with specificity from the other electronic devices 102. Accordingly, location tracking module 126 may provide this information to the location interaction module 128, which may determine an identity and user account information associated with each electronic device 102 detected to be present at the physical location 502 at the appointed date and time. Furthermore, the location interaction module 128 may verify from the user information 132 which of the electronic devices 102 present at the physical location 502 have the digital work 106c present in the respective digital work library of the respective electronic device 102. Consequently, the location interaction module 128 may use this information to send the promotion 504 directly to the respective electronic devices 102 at the physical location 502 that have satisfied the requirements for receiving the promotion 504.

Example Interfaces

Figure 6:
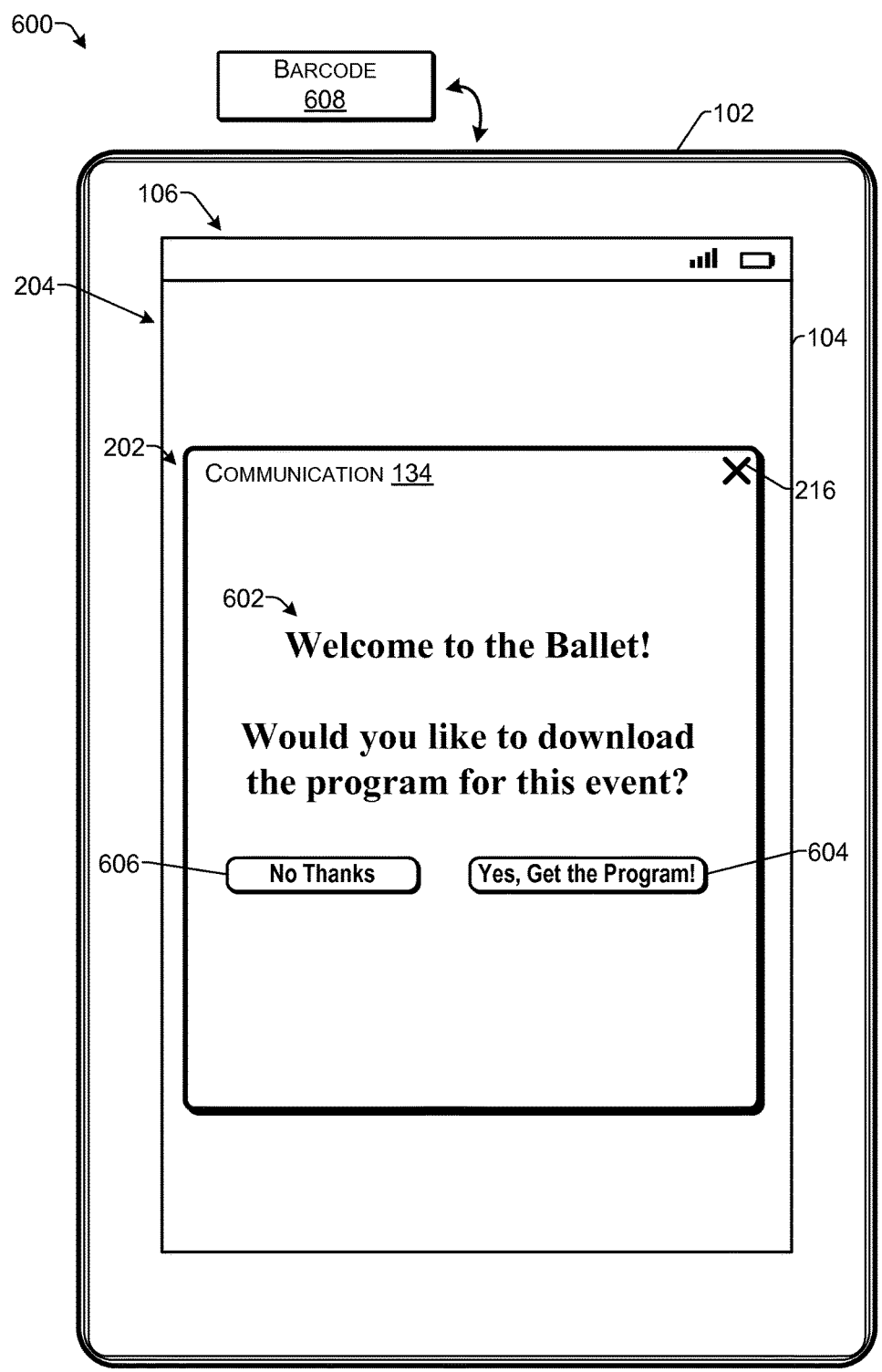
FIG. 6 illustrates an example electronic device displaying an interface for location-based interaction in connection with a digital work according to some implementations.

FIG. 6 illustrates an example electronic device 102 displaying an interface 600 for location-based interaction in connection with a digital work according to some implementations. For example, suppose that a user of the electronic device 102 is attending an event, such as a theatre production, a sporting event, a circus, a concert, a ballet, etc., where it is a common practice to distribute event programs for the event. The service provider 112 may have an agreement with the event promoter to distribute programs or other electronic books for the event electronically as digital works.

Accordingly, in some examples, when the service provider 112 detects that the electronic device 102 of a user is at the location or venue of the event, such as based on the location information 118 discussed above, the service provider computing device 110 may send a communication 134, such as that illustrated in the interface 600 of FIG. 6 to the electronic device 102. For example, the communication 134 may appear in a pop-up window 202 or as another type of communication, as discussed above, and may include a message 602 that identifies the event, and that offers to provide the program for the event as a digital work that may be delivered to the electronic device 102. For example, if the user desires to obtain the program for the event, the user may select a button 604 to get the program. On the other hand, if the user does not desire the program for the event, the user may select a button 606 to refuse the offer for the program. Furthermore, in the case that there is a charge for the program, the user may be provided with the price for the program, and may consent to being charged for the program the through user's account with the service provider by selecting the button 604. In some examples, a follow-up confirmation interface may be provided to enable the user to confirm the purchase.

As an alternative, rather than having the service provider 112 rely on location detection of the electronic device 102 to extend the offer 602 for the program, a barcode 608, which may including an ASIN, an ISBN, or other identifier, may be located near the entrance to the event, such as at stand that also sells paper copies of the program. The barcode may be a one-dimensional or two-dimensional barcode, or any other suitable type of encoded information. The user may scan or take an image of the barcode 608 with the electronic device 102 as discussed above, such as with a camera. The barcode information may be sent to the service provider computing device 110, which, in response, may make the event program available for delivery to the particular electronic device 102. Alternatively, other information may be used should the electronic device 102 be unable to obtain an image of the barcode 608. For example, the user 114 may enter the digits corresponding to the ASIN or ISBN, or send other information to the service provider to obtain the event program as a digital work.

As another example, such as in the case where the user is a student, the location information 118 may indicate that the student has entered the classroom for a particular class. The location interaction module may send the student a communication 134 inquiring as to whether the student would like to download notes or an outline for the day's coming lecture. Similarly, for an individual attending a conference or presentation, the location information may indicate that the individual is at the conference or presentation and may offer to provide slides or written material corresponding to the conference or presentation.

As still another example, such as when an electronic device 102 of a user is detected as being at a particular location, the service provider computing device 110 may send a communication 134 that may include a special offer related to the location. For example, if the user is detected as being near to a particular business, the service provider computing device 110 may send a communication 134 including a discount coupon, or other promotional deal that the user may download to the electronic device 102 and use at the business.

Figure 7:
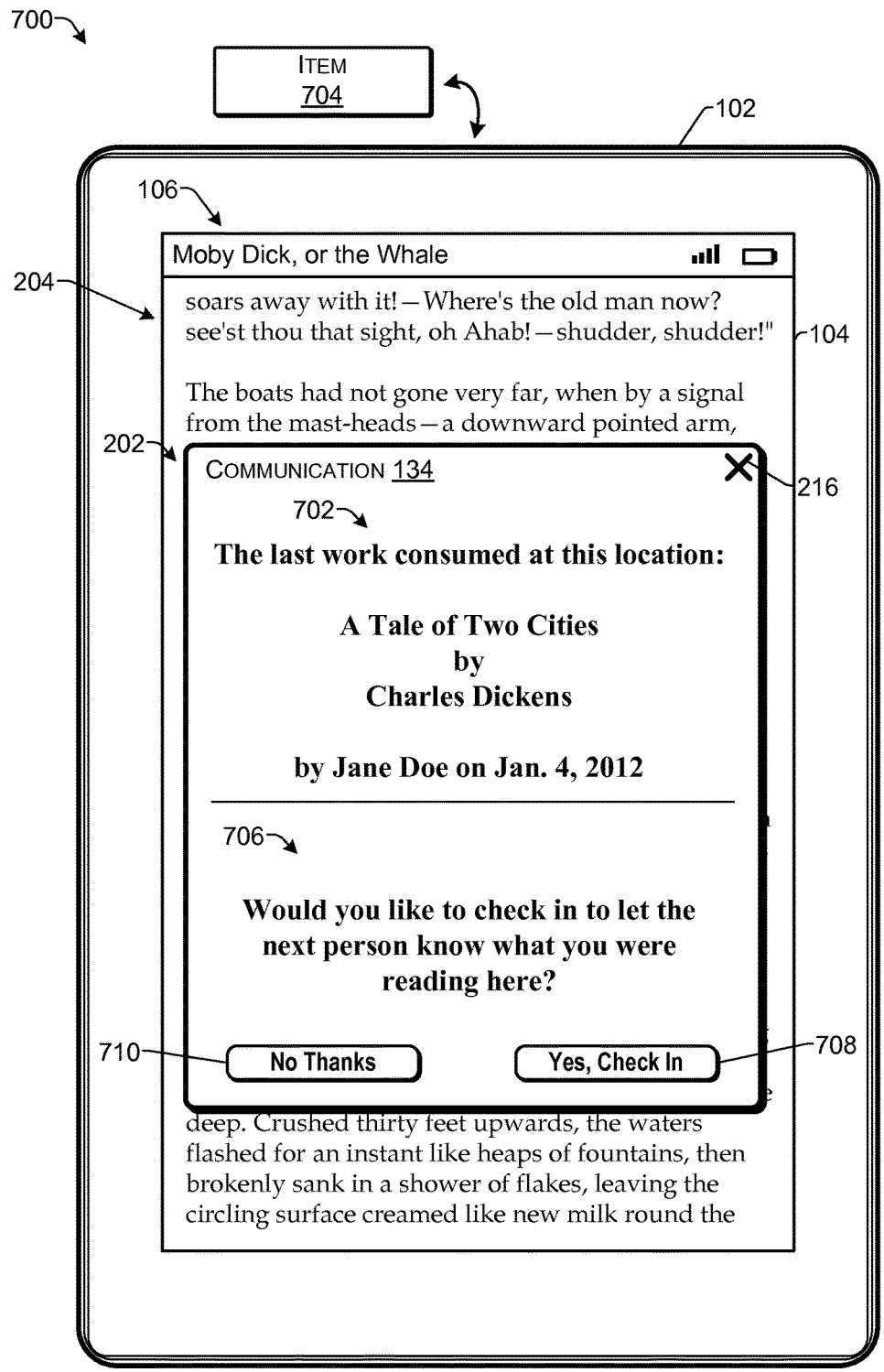
FIG. 7 illustrates an example electronic device displaying an interface for location-based interaction in connection with a digital work according to some implementations.

FIG. 7 illustrates an example electronic device displaying an interface 700 for location-based interaction in connection with a digital work according to some implementations. In this example, the communication 134 may include a message 702 that identifies the digital work that was most recently read by a previous user at the current location of the user. For example, depending on the accuracy of the location detection, the location may correspond to a lobby of a hotel, a room in the hotel, a café or coffee shop, a particular chair in a lobby, coffee shop, restaurant, or other public location, and the like. As another alternative, rather than relying on a GPS device or other location information, the user may take an image of an item 704 or may actively enter other information to identify the current location with particularity. For instance, an earlier user my leave a barcode or other item 704 including identifying information that positively identifies the particular location, such as for identifying a particular piece of furniture, particular room, particular place of business, or the like, to the service provider 112.

Alternatively, rather than using a barcode, an image of an item 704, such as a sign, an landmark, or other physical object at the location may be sent to the service provider computing device 110 to identify a location. For example, a user that arrives at the location may take an image of one or more items to indicate, at least in part, the user's current location. For instance, the user may use a camera to take an image of a sign belonging to a business, a street address, a landmark, or other physical object, and the service provider may match the image with one or more images previously obtained or otherwise associated with the location to determine, at least in part, the current location of the user's device 102. As one example, a donating user, who leaves a digital work at a location, may take an image of an identifiable physical object at the location at which the donating user leaves the digital work and may communicate this image to the service provider computing device 110. The service provider computing device 110 may store the image(s) received from the donating user and/or any subsequent users with the location interaction information 130 for the particular location.

Further, in some instances, the message 702 may include the name or username of the person who last checked in at this location and the date at which the check-in occurred. Alternatively, in other implementations, the name of the person and/or the date that the person checked-in may not be included in the message 702. Furthermore, the communication 134 may include an additional message 706 that invites the user to check-in to also let the next person to arrive at the location know what the current user is reading at the current location. For example, the user may select a button 708 to check-in and in response, the title of the digital work that the user is currently reading and optionally the name of the user and date that the user checked-in may be stored with the location interaction information 130 and associated with the current location of the user for display the next time that an electronic device 102 of a user is detected at the current location. Alternatively, if the user opts not to check-in, the user may select button 710.

Example Electronic Device

Figure 8:
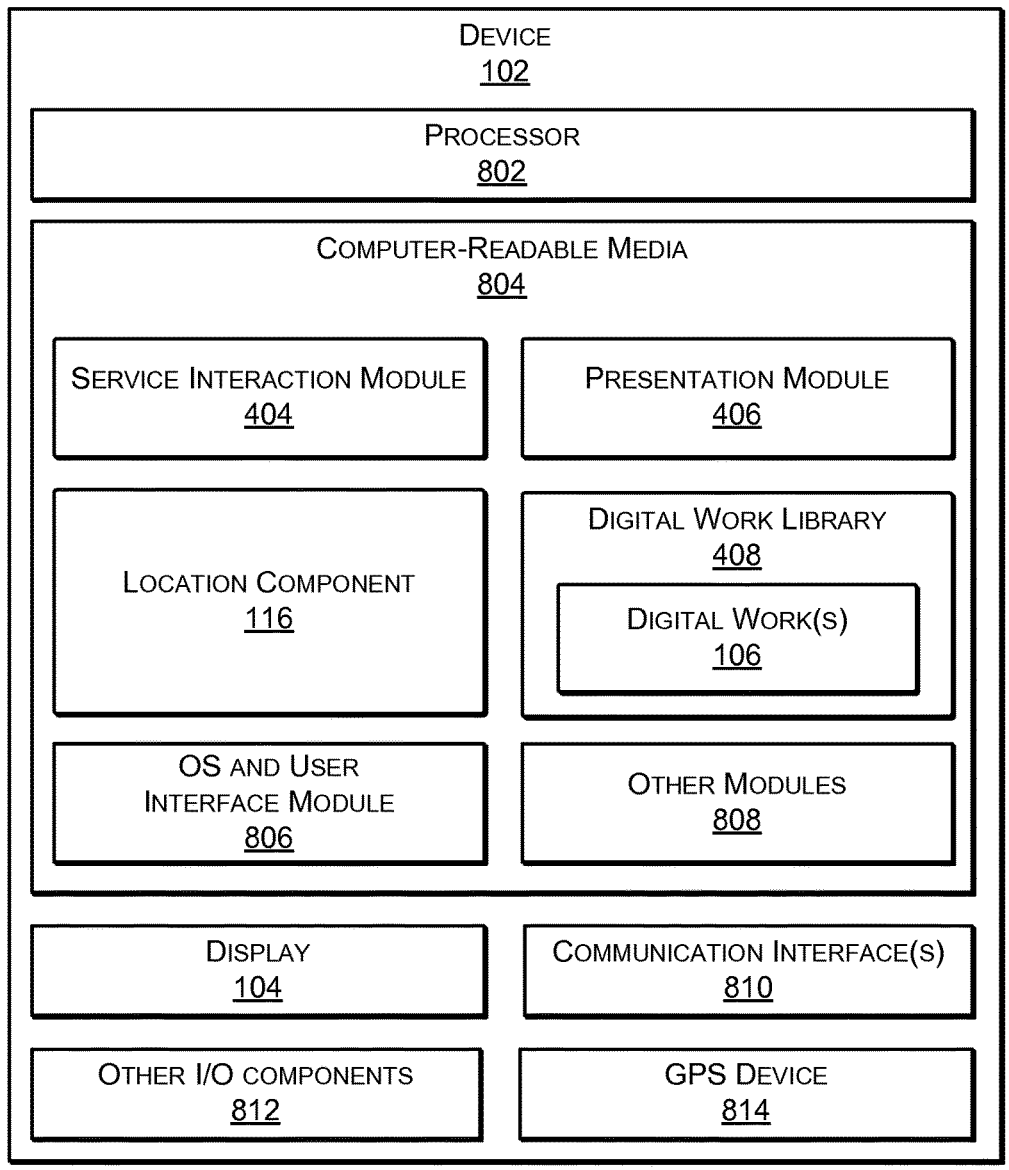
FIG. 8 illustrates select components of an example electronic device according to some implementations.

FIG. 8 illustrates select example components of the electronic device 102 that may be used to implement the functionality described above according to some implementations. In a very basic configuration, the electronic device 102 includes, or accesses, components such as at least one processor 802 and a computer-readable media 804. Each processor 802 may itself comprise one or more processors or cores. Depending on the configuration of the electronic device 102, the computer-readable media 804 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 802 directly or through another computing device. Accordingly, the computer-readable media 804 may be computer-readable media able to maintain instructions, modules or components executable by the processor 802.

The computer-readable media 804 may be used to store any number of functional components that are executable by the processor 802. In some implementations, these functional components comprise instructions or programs that are executable by the processor 802 and that, when executed, implement operational logic for performing the actions attributed above to the electronic device 102. Functional components of the electronic device 102 stored in the computer-readable media 804 may include the digital work presentation module 406, as described above, which may be executed on the processor 802 for presenting the one or more digital works 106 contained in the digital work library 408. Additional functional components stored in the computer-readable media 804 may include the service interaction module 404, executable by the processor 802 for obtaining the digital work(s) 106 from the service provider site 402. Furthermore, the computer-readable media 804 may include the location component 116, which in some examples, may include a software component executable by the processor 802 for actively providing location information to the service provider computing device 110. Other functional components may include an operating system and user interface module 806 for controlling and managing various functions of the electronic device 102. Depending on the type of the electronic device 102, the computer-readable media 804 may also optionally include other functional components, such as other modules 808, which may include applications, programs, drivers and so forth.

The computer-readable media 804 may also store data, data structures, and the like that are used by the functional components. For example, data stored by the computer-readable media 804 may include the digital work library 408, containing one or more digital works 106. The electronic device 102 may also include other data, which may include, for example, data used by the service interaction module 404, the operating system and user interface module 806, and the other modules 808. Further, the electronic device 102 may include many other logical, programmatic and physical components, of which those described are merely examples that are related to the discussion herein.

FIG. 8 further illustrates the display 104, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 104 may be an active display such as a liquid crystal display, plasma display, light emitting diode display, organic light emitting diode display, and so forth. These displays may comprise drive electronics, such as a display drive matrix configured to affect individual pixels within the display 104. Additionally, in some implementations, the display 104 may be a 3D display capable of providing a 3D image. For example, the display 104 may produce a 3D image by providing alternating left-eye and right-eye images with or without the use of shuttering or filtering eyeglasses. Accordingly, in some implementations, the visual representations and other user interface components herein may be rendered in 3D.

One or more communication interfaces 810 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 810 may allow a user of the electronic device 102 to access the World Wide Web, download digital works from the service provider site 402, access online content, such as from a website or other network location, and the like. The communication interface 810 may further allow a user to access storage on another device, such as a user's computing device, a network attached storage device, or the like. In some cases, the communication interface(s) 810 may be used by the location component 116 to identify, at least in part, a current location of the device 102.

The electronic device 102 may further be equipped with various other input/output (I/O) components 812. Such I/O components may include a touchscreen and various user controls (e.g., buttons, a joystick, a keyboard, a mouse, etc.), speakers, a microphone, a camera, connection ports, and so forth. For example, the operating system 806 of the electronic device 102 may include suitable drivers configured to accept input from a keypad, keyboard, or other user controls and devices included as the I/O components 812. For instance, the user controls may include page turning buttons, navigational keys, a power on/off button, selection keys, and so on. Further, in some examples, the electronic device may include a global positioning system (GPS) device 814 that may be used by the location component 116, at least in part, for identifying a current location of the electronic device 102. Additionally, the electronic device 102 may include various other components that are not shown, examples of which include removable storage, a power source, such as a battery and power control unit, a PC Card component, and so forth.

Example Computing Device

Figure 9:
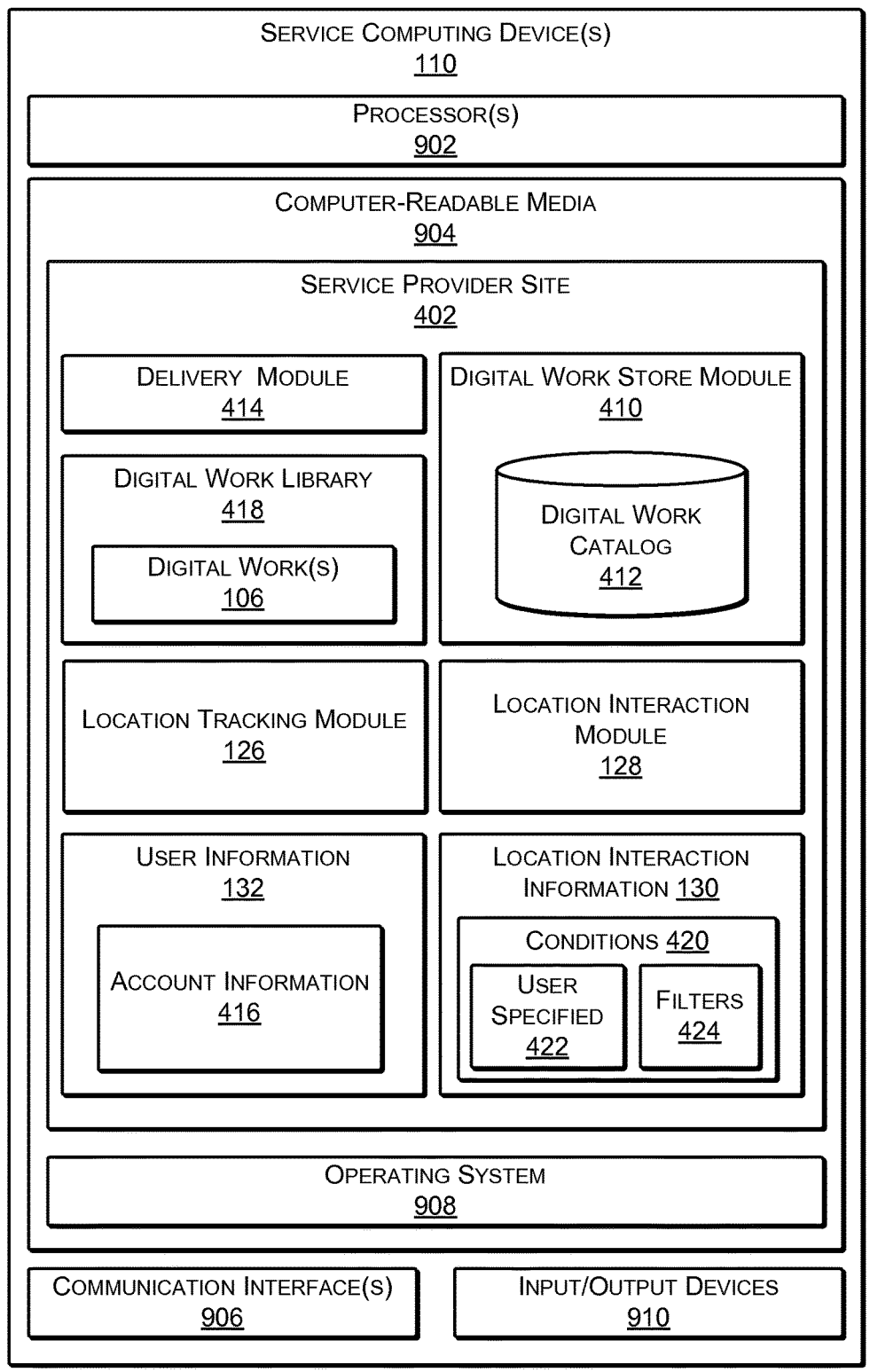
FIG. 9 illustrates select components of one or more example service computing devices of a service provider according to some implementations.

FIG. 9 illustrates select components of one or more service computing devices 110 that may be used to implement the functionality of the service provider site 402 according to some implementations. The service provider site 402 may be hosted on one or more servers or other types of computing devices that may be embodied in any number of ways. For instance, in the case of a server, the service provider site 402 may be implemented on a single server, a cluster of servers, a server farm or data center, a cloud hosted computing service, and so forth, although other computer architectures (e.g., a mainframe architecture) may also be used. Further, while the figures illustrate the components of the service provider site 402 as being present in a single location, it is to be appreciated that these components may be distributed across different computing devices and locations in any manner. Generally, the service provider site 402 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 9, an example service computing device 110 includes one or more processors 902, one or more computer-readable media 904, and one or more communication interfaces 906. The processor(s) 902 may be a single processing unit or a number of processing units, and may include single or multiple computing units or multiple cores. The processor(s) 902 can be configured to fetch and execute computer-readable instructions stored in the computer-readable media 904 or other computer-readable media.

The computer-readable media 904 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 110, the computer-readable media 904 may be a type of computer-readable storage media and may be a non-transitory storage media.

The computer-readable media 904 may be used to store any number of functional components that are executable by the processors 902. In many implementations, these functional components comprise instructions or programs that are executable by the processors 902 and that, when executed, implement operational logic for performing the actions attributed above to the service provider site 402 and the service provider 112. Functional components of the service provider site 402 that may be executed on the processors 902 for implementing the various functions and features related to location based interaction, as described herein, may include the location tracking module 126, the location interaction module 128, the digital work store module 410, and the delivery module 414. Additional functional components stored in the computer-readable media 904 may include an operating system 908 for controlling and managing various functions of the service computing device(s) 110.

In addition, the computer-readable media 904 may include, or the service computing device(s) 110 may access, data that may include the digital work library 418, including one or more digital works 106. The data may further include the location interaction information 130, including the conditions 420, such as user specified conditions 422 and/or eligibility filters 424, as well as the user information 132. In addition, the computer-readable media 904 may store or the service computing devices(s) 110 may access the digital work catalog 412 used by the digital work store module 410. The service computing device(s) 110 may also include many other logical, programmatic and physical components, of which those described above are merely examples that are related to the discussion herein.

The communication interface(s) 906 may include one or more interfaces and hardware components for enabling communication with various other devices, such as the electronic devices 102, over the network(s) 108. For example, communication interface(s) 906 may facilitate communication through one or more of the Internet, cable networks, cellular networks, wireless networks (e.g., Wi-Fi, cellular) and wired networks. Various different approaches to the examples described herein can be implemented in various environments. For instance, the network(s) 108 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Service computing device(s) 110 may further be equipped with various input/output devices 910. Such I/O devices 910 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 10-14 illustrate example processes for location-based interaction in connection with a digital work according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

Figure 10:
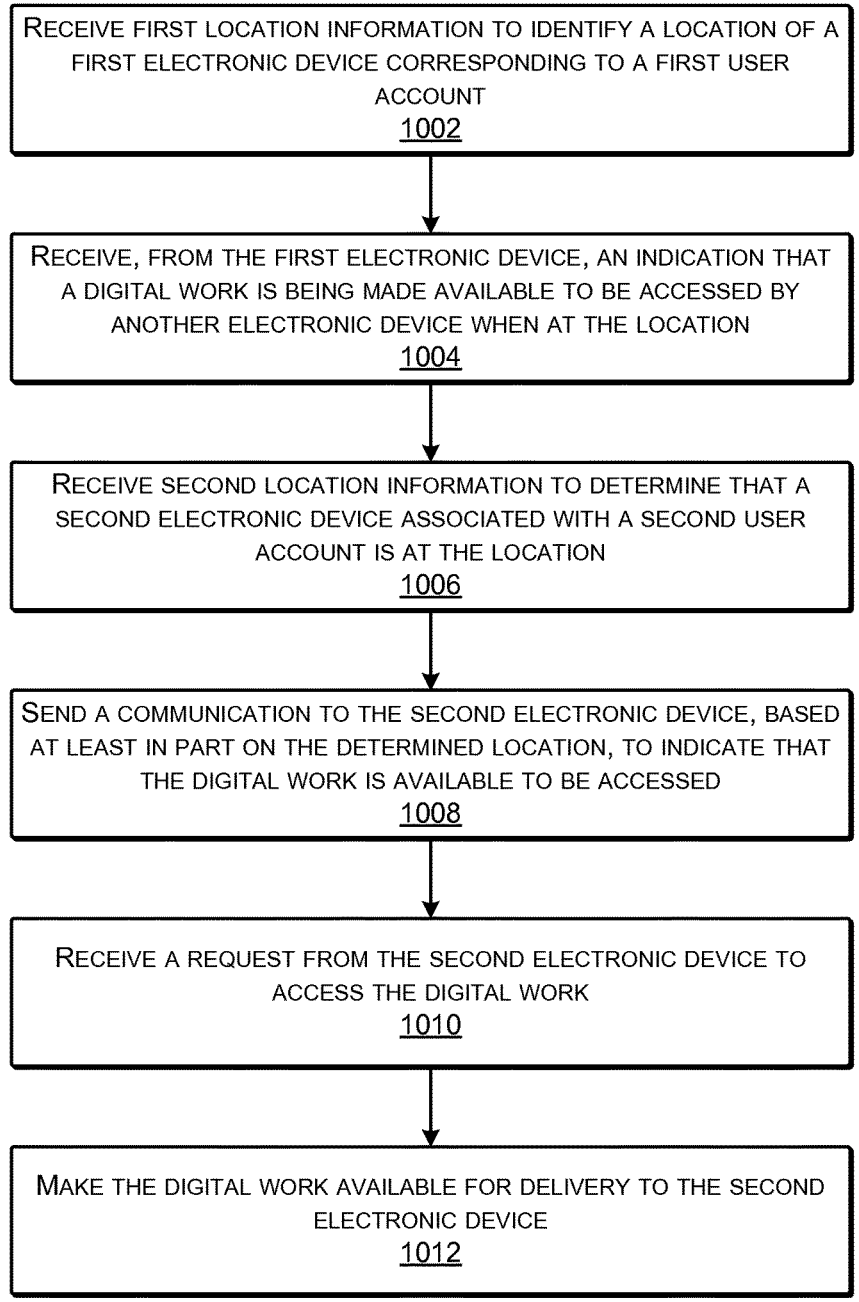
FIG. 10 is a flow diagram illustrating an example process for providing location-based interaction in connection with a digital work according to some implementations.

FIG. 10 is a flow diagram illustrating an example process 1000 that may be executed by the service computing device of the service provider for providing location-based interaction in connection with a digital work according to some implementations.

At 1002, a computing device receives first location information to identify a location of a first electronic device corresponding to a first user account. For example, the computing device may receive a communication or other information from a first electronic device to enable identification of the location of the first electronic device.

At 1004, the computing device receives, from the first electronic device, an indication that a digital work is being made available to be accessed by other electronic devices when they are at the identified location. For example, a user of the first electronic device may decide to virtually leave a particular digital work at the particular location.

At 1006, the computing device receives second location information to determine that a second electronic device associated with a second user account is currently at the location. For example, the computing device may receive a communication or other information from a second electronic device to enable identification of the location of the second electronic device as being at the same location that was previously occupied by the first electronic device.

At 1008, the computing device sends a communication to the second electronic device, based at least in part on the determined location, to indicate that the digital work is available to be accessed by the second electronic device. For example, the computing device may refer to location interaction information to determine that the digital work is available to an electronic device that is at the particular location of the second electronic device.

At 1010, the computing device receives a request from the second electronic device to access the digital work. For example, in response to receiving the communication from the computing device, the user of the second electronic device may decide to download the digital work.

At 1012, the computing device makes the digital work available for delivery to the second electronic device. For example, the computing device may allow the second electronic device to download the digital work from the service provider site.

Figure 11:
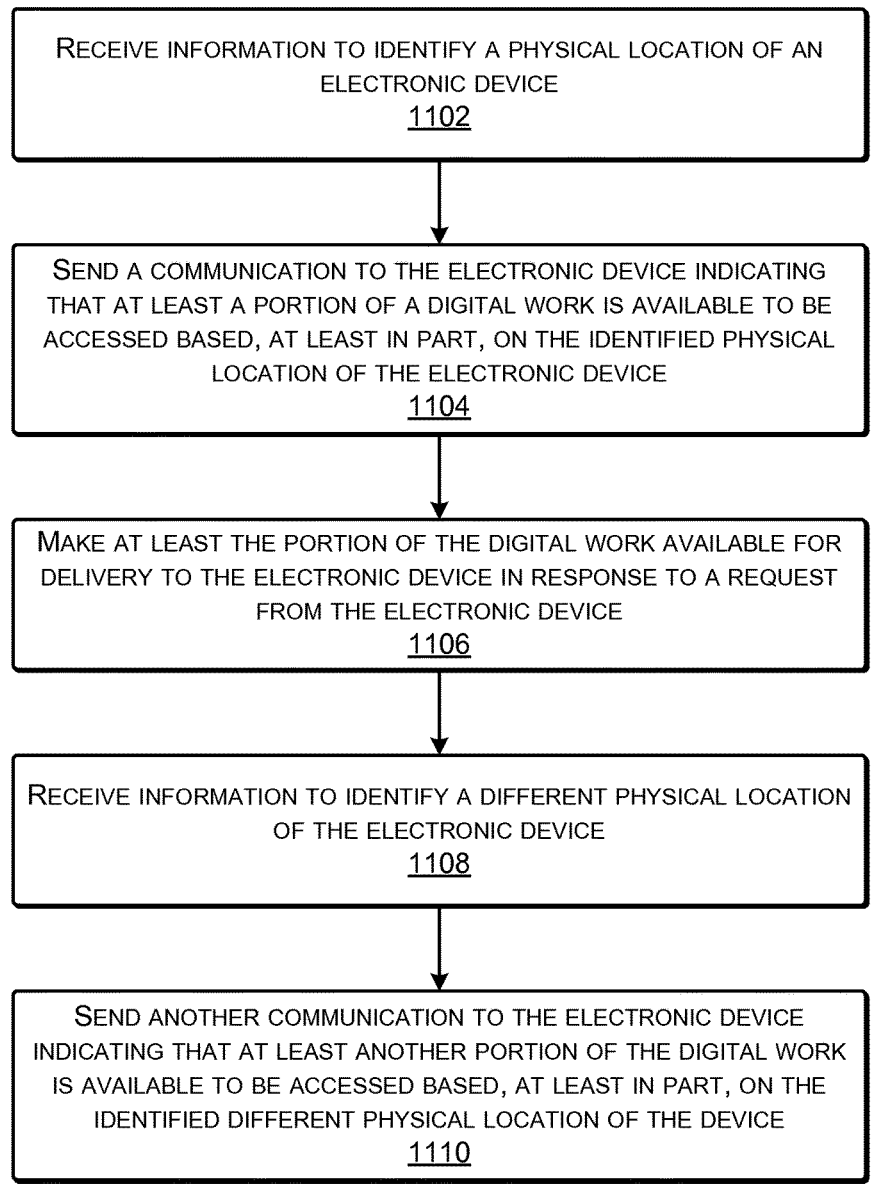
FIG. 11 is a flow diagram illustrating an example process for providing location-based interaction in connection with a digital work according to some implementations.

FIG. 11 is a flow diagram illustrating an example process 1100 that may be executed by the service computing device for providing location-based interaction in connection with a digital work according to some implementations herein.

At 1102, the computing device receives information to identify a physical location of an electronic device. For example, the computing device may identify the physical location of the electronic device based, at least in part, on a communication received from the electronic device.

At 1104, the computing device sends a communication to the electronic device indicating that at least a portion of a digital work is available to be accessed based, at least in part, on the identified physical location of the electronic device. For example, in some cases, the digital work may be spread over several different locations as part of a game, challenge, etc. Accordingly, a portion of the digital work may be available when the electronic device is at a first physical location.

At 1106, the computing device makes at least a portion of the digital work available for delivery to the electronic device in response to a request from the electronic device. For example, the electronic device may download the portion of the digital work available in connection with the first location.

At 1108, the computing device receives information to identify a different physical location of the electronic device. For example, the computing device may receive a new communication from the electronic device that may indicate a different physical location of the electronic device.

At 1110, the computing device may send another communication to the electronic device indicating that at least another portion of the digital work is available to be accessed based, at least in part, on the identified different physical location of the electronic device. For example, the user of the electronic device may travel from one physical location to the next to collect all of the portions of the digital work. In some cases, the user may be provided with clues to identify the physical locations corresponding to each portion of the digital work.

Figure 12:
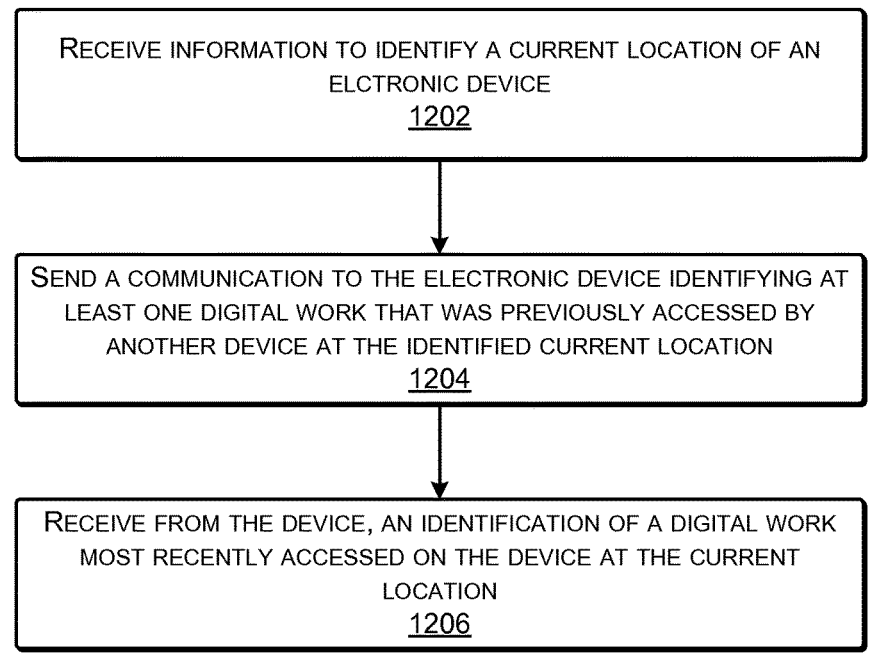
FIG. 12 is a flow diagram illustrating an example process for providing location-based interaction in connection with a digital work according to some implementations.

FIG. 12 is a flow diagram illustrating an example process 1200 that may be executed by the service computing device for providing location-based interaction in connection with a digital work according to some implementations herein.

At 1202, the computing device receives information to identify a current location of an electronic device. For example, the computing device may receive location information provided by the electronic device such as from a GPS device, a cell tower, a wireless access point, an IP address, a barcode, or the like.

At 1204, the computing device sends a communication to the electronic device identifying at least one digital work that was previously accessed by another electronic device at the identified current location. For example, the computing device may send a communication including a message that identifies a digital work most recently accessed at the current location by another user.

At 1206, the computing device receives from the electronic device an identification of a digital work most recently accessed on the electronic device at the current location. For example, the user of the electronic device may check-in or otherwise send the identification of the digital work that the user is currently reading at the current location.

Figure 13:
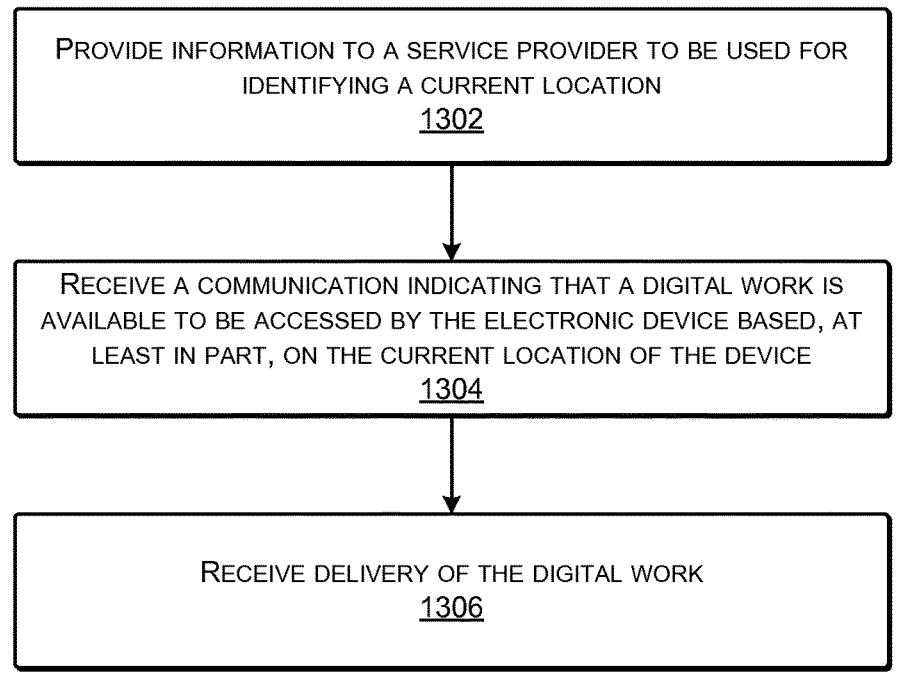
FIG. 13 is a flow diagram illustrating an example process for location-based interaction in connection with a digital work according to some implementations.

FIG. 13 is a flow diagram illustrating an example process 1300 that may be executed by an electronic device for location-based interaction in connection with a digital work according to some implementations herein.

At 1302, the electronic device provides information to a service provider to be used for identifying a current location of the device. For example, the device may merely send a communication to the service provider that may be used to identify the current location of the device based on an origin point of the communication. Alternatively, the device may actively determine the current location of the device, such as from GPS coordinates, an access point identification, or the like, and may provide this information to the service provider computing device.

At 1304, the electronic device receives a communication indicating that a digital work is available to be accessed by the device based at least in part on the current location of the electronic device. For example, one or more digital works may be available to be downloaded by the electronic device based on the current location of the device.

At 1306, the electronic device receives delivery of the digital work. For example, the electronic device may send a request in response to the communication to receive the digital work that is available for access at the current location.

Figure 14:
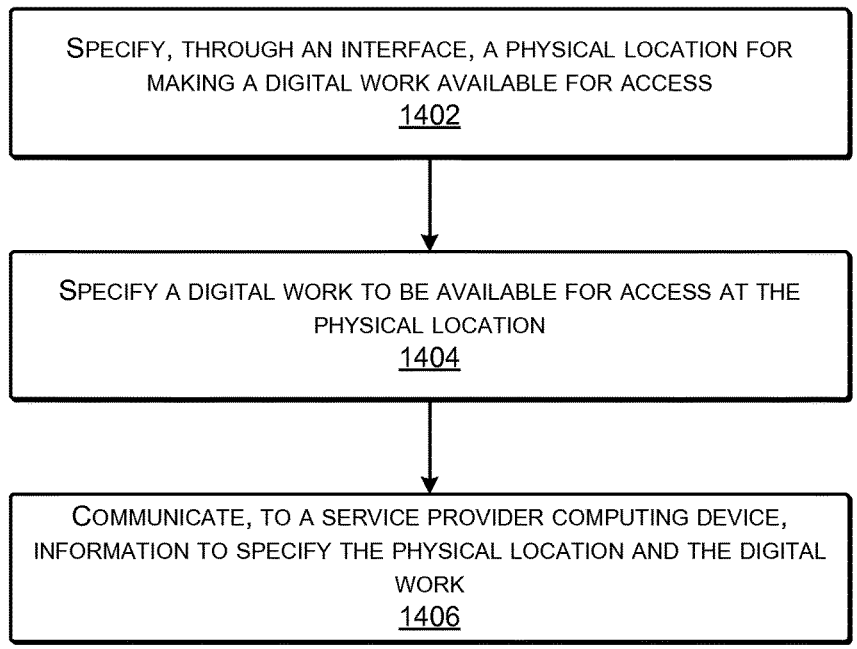
FIG. 14 is a flow diagram illustrating an example process for specifying location-based interaction in connection with a digital work according to some implementations.

FIG. 14 is a flow diagram illustrating an example process 1400 that may be executed by an electronic device for location-based interaction in connection with a digital work according to some implementations herein.

At 1402, the electronic device receives, through an interface, a specification of a physical location for making a digital work available for access by another electronic device associated with a different user account. For example, the user of the electronic device may decide to leave the digital work to be accessed by other users at a particular physical location even though the user of the electronic device is not currently at that physical location. For instance, suppose the user would like to leave a particular digital work at a physical location in another city, another state, another country, etc. The electronic device 102 may present an interface that includes a map, or other tools to enable the user to select a particular physical location or vicinity at which to leave the digital work. For example, the user might select any identifiable physical location such as a street, a hotel, a museum, a train station, an airport, a business, a sports venue, etc. through a map displayed on the interface of the electronic device 102.

At 1404, the electronic device may further receive a specification of a digital work to be made available for access at the physical location. For example, before or after selecting the physical location in 1402, the user may specify a digital work to be left at the physical location, such as a digital work from the user's digital work library. Alternatively, the user may purchase or otherwise obtain the specified digital work from the service provider as part of the process for specifying the digital work to be available for access at the physical location.

At 1406, the electronic device may communicate to the service provider information to specify the physical location and the digital work to be made available for access at the physical location. Accordingly, in some cases, the user of the electronic device may select a physical location to which the user has actually never been, and may further specify a digital work to be left at the physical location for access by one or more other users. Additionally, as mentioned above, in some cases, the user, the service provider and/or the publisher may attach or specify conditions to allowing access to the selected digital work at the specified physical location.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
    receiving first location information to indicate a first location of a first electronic device corresponding to a first user account;
    receiving, from the first electronic device, a first indication that a first portion of a digital work associated with the first user account is being made available to be accessed by at least one other electronic device corresponding to a different user account based on a determination that the at least one other electronic device is determined to be within a threshold distance of the first location;
    receiving, from the first electronic device, a second indication that a second portion of the digital is being made available to be accessed by the at least one other electronic device based on a determination that the at least one other electronic device is determined to be within a threshold distance of a second location that is different from the first location;
    based at least in part on the indication that the first portion of the digital work and the second portion of the digital work is being made available, disabling access to the digital work for the first electronic device, wherein the disabling access to the digital work for the first electronic device comprises sending an instruction to the first electronic device to remove a copy of the digital work from the first electronic device;
    receiving second location information indicating that a second electronic device associated with a second user account is within the threshold distance of the first location;
    sending a communication to the second electronic device, based at least in part on the second location information indicating that the second electronic device is within the threshold distance of the first location, the communication indicating that the first portion of the digital work is available to be accessed by the second electronic device;
    receiving a request from the second electronic device to access the first portion of the digital work; and
    making the first portion of the digital work available for delivery to the second electronic device.

2. The one or more non-transitory computer-readable media as recited in claim 1, the operations further comprising disabling access to the digital work for a third electronic device associated with the first user, wherein the disabling access to the digital work for the third electronic device comprises sending an instruction to third electronic device to remove another copy of the digital work from the third electronic device.

3. The one or more non-transitory computer-readable media as recited in claim 1, the operations further comprising applying one or more conditions to the delivery of the first portion of the digital work to the second electronic device, wherein at least one of the conditions is satisfied before making the first portion of the digital work available for delivery.

4. The one or more non-transitory computer-readable media as recited in claim 3, wherein the one or more conditions include specifying a geographic area within which the first portion of the digital work is to be consumed.

5. The one or more non-transitory computer-readable media as recited in claim 3, wherein the one or more conditions are related to at least one of:
    an age of a user corresponding to the second user account associated with the electronic device;
    a social network affiliation of the user;
    a microblog affiliation of the user;
    a country in which the digital work is to be accessed;
    a country of residence of the user;
    an account type of the second user account; or
    a profile of the user.

6. The one or more non-transitory computer-readable media as recited in claim 1, the operations further comprising, prior to sending the communication to the second electronic device, determining that the first user and the second user are affiliated by at least one of:
    being friends or friends of friends in social network; or
    being affiliated through a microblog account.

7. A method comprising:
    under control of one or more processors configured with executable instructions,
    receiving, from a first device associated with a first user, a first communication indicating that:
        a first portion of a digital work is to be made available to be accessed at a first physical location by at least one other device associated with a different user, wherein the first physical location is different than a current location of the first device, and
        a second portion of the digital work is to be made available to be accessed at a second physical location by the at least one other device associated with the different user, wherein the second physical location is different than the first physical location and the current location of the first device;
    storing, in association with the first location, location interaction information associated with one or more titles of one or more digital works consumed at the first location by one or more users;

receiving information indicating a third physical location of a second device associated with a second user, the third physical location of the second device being within a threshold distance of the first physical location; and sending a second communication to the second device indicating at least one of (i) that the first portion of the digital work is available to be accessed by the second device and (ii) at least a title of the one or more titles of the one or more digital works consumed at the first physical location, based at least in part, on the third physical location of the second device.

8. The method as recited in claim 7, further comprising making the first portion of the digital work available for delivery to the second device in response to a request from the second device.

9. The method as recited in claim 8, wherein the information is first information, and further comprising:

receiving second information indicating that the second device is at a fourth physical location different from the third physical location; and sending a third communication to the second device indicating that the second portion of the digital work is available to be accessed by the second device based, at least in part, on the fourth physical location of the second device being within a threshold distance of the second physical location.

10. The method as recited in claim 7, wherein:
the first physical location corresponds to a venue;
the sending the second communication corresponds to a timing of an event scheduled at the venue; and
the first portion of the digital work is related to the event.

11. The method as recited in claim 7, wherein receiving the information indicating the third physical location of the second device includes receiving an image of an item at the third physical location.

12. The method as recited in claim 11 wherein the image of the item is of one or more of:
a barcode;
a physical object at the location;
a sign; or
a landmark.

13. The method as recited in claim 7, further comprising, based at least in part on the first communication, disabling access to the digital work for the first device, wherein the disabling access to the digital work for the first device comprises sending an instruction to the first device to remove a copy of the digital work from the first device.

14. An electronic device comprising:
one or more processors;
one or more non-transitory computer-readable media; and
one or more modules maintained on the one or more computer-readable media to be executed by the one or more processors to perform operations including:
communicating with a remote computing device over a network;
receiving a first communication from the remote computing device based at least in part on a first current location of the electronic device, the first communication indicating that a first portion of a digital work is available to be accessed by the electronic device and including information associated with a physical location where a second portion of the digital work is available to be accessed, the first portion of the digital work having been enabled to be accessible to a different electronic device; and receiving a second communication from the remote computing device based at least in part on a second current location of the electronic device being with a threshold distance of the physical location, the second communication indicating that the second portion of the digital work is available to be accessed by the electronic device.

15. The electronic device as recited in claim 14, the communicating further comprising:
sending location information obtained by the electronic device; and
providing an identifier for identifying a user account associated with the electronic device.

16. The electronic device as recited in claim 14, wherein:
the first current location of the electronic device is within a predefined distance of a venue of a scheduled event and at a timing corresponding to the scheduled event; and
the first portion of the digital work is related to the scheduled event.

17. The electronic device as recited in claim 14, further comprising receiving an instance of the first portion of the digital work based, at least in part, on at least one condition, the at least one condition specifying that consumption of the instance of the first portion of the digital work is to take place within a geographic region including the first current location.

18. The electronic device as recited in claim 14, wherein an instance of the first portion of the digital work is received as a promotion in response to determining that:
the electronic device is within a predefined distance of the first current location; and
the electronic device has a different digital work stored thereon identified to receive the promotion.

19. The electronic device as recited in claim 14, the communicating further comprising:
obtaining an image of an item at the first current location; and
sending the image of the item over a network, the image of the item indicating at least one of:
the first current location; or
an identification of the first portion of the digital work available to be accessed.

20. A system comprising:
one or more processors;
one or more non-transitory computer-readable media; and
one or more modules maintained on the one or more computer-readable media to be executed by the one or more processors to perform operations including:
receiving first information indicating a first current location of a first device;
identifying a copy of a digital work having an association with the first current location of the first device, the association being based at least in part on a first selection of a first portion of the copy of the digital work received from a second device and a second selection of a second portion of the copy of the digital work received from the second device;
determining one or more conditions associated with the digital work available to be accessed by the first device based, at least in part, on the first current location of the first device;
based at least in part on the first current location of the device, enabling the first portion of the copy of the digital work to be accessed by the first device;
based at least in part on the first device accessing the first portion of the copy of the digital work at the first current location, transmitting to the first device information associated with a physical location where the second portion of the copy of the digital work is available to be accessed, wherein the physical location is different from the first current location;

receiving second information indicating a second current location of the first device; and based at least in part on the second current location of the first device being within a threshold distance of the physical location, enabling the second portion of the copy of the digital work to be accessed by the first device.

21. The system as recited in claim 20, wherein at least one of the one or more conditions is set by a publisher of the digital work to limit a geographic region of distribution of the digital work.

22. The system as recited in claim 20, wherein at least one of the one or more conditions limits an age of a user permitted to access the digital work.

23. The system as recited in claim 20, wherein at least one of the one or more conditions specifies a type of user account that is provided access to the digital work.

24. The system as recited in claim 20, wherein at least one of the one or more conditions specifies a social affiliation of a user permitted to access the digital work.

25. The system as recited in claim 20, wherein receiving first information indicating a first current location of the first device further comprises receiving location information based on at least one of:

global positioning system information;

identification of a wireless access point used by the first device;

identification of a cellular communication tower used by the first device; or identification of an IP (Internet Protocol) address used by the first device.

26. The one or more non-transitory computer-readable media as recited in claim 1, the operations further comprising, based in part on an occurrence of an event, disabling access to the first portion of the digital work for the second electronic device and enabling the first electronic device to access the digital work.

27. The system as recited in claim 20, wherein enabling the first portion of the copy of the digital work to be accessed by the first device comprises the first portion of the copy of the digital work being available for download via a third-party provider.

28. The system as recited in claim 20, wherein the first device information comprises one or more clues to identify the physical location of the second portion of the copy of the digital work.

29. The one or more non-transitory computer-readable media as recited in claim 1, wherein the first location corresponds to a first wireless access point, and the second location corresponds to a second wireless access point, the first wireless access point being different from the second wireless access point.

30. The one or more non-transitory computer-readable media as recited in claim 1, wherein the first indication is further received based on a third electronic device associated with the digital work being located at the first location.

* * * * *